(12) United States Patent
Hai et al.

(10) Patent No.: US 12,548,368 B2
(45) Date of Patent: Feb. 10, 2026

(54) RIDGE IDENTIFICATION MODULE, MANUFACTURING METHOD THEREOF AND DISPLAY APPARATUS

(71) Applicant: BOE Technology Group Co., Ltd., Beijing (CN)

(72) Inventors: Xiaoquan Hai, Beijing (CN); Yingzi Wang, Beijing (CN); Xue Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 362 days.

(21) Appl. No.: 18/028,304

(22) PCT Filed: Mar. 22, 2022

(86) PCT No.: PCT/CN2022/082287
§ 371 (c)(1),
(2) Date: Mar. 24, 2023

(87) PCT Pub. No.: WO2023/178516
PCT Pub. Date: Sep. 28, 2023

(65) Prior Publication Data
US 2024/0312245 A1    Sep. 19, 2024

(51) Int. Cl.
*G06V 40/13* (2022.01)
*G06V 40/12* (2022.01)

(52) U.S. Cl.
CPC ...... *G06V 40/1376* (2022.01); *G06V 40/1318* (2022.01)

(58) Field of Classification Search
None
See application file for complete search history.

(56) References Cited

U.S. PATENT DOCUMENTS

| 2016/0342824 A1 | 11/2016 | Lee et al. |
| 2017/0206843 A1 | 7/2017 | Liu et al. |

(Continued)

FOREIGN PATENT DOCUMENTS

| CN | 104898322 A | 9/2015 |
| CN | 104934008 A | 9/2015 |

(Continued)

*Primary Examiner* — Joseph R Haley
(74) *Attorney, Agent, or Firm* — IPro, PLLC

(57) ABSTRACT

This disclosure relates a ridge identification module, a manufacturing method thereof and a display apparatus. The ridge identification module includes a ridge identification substrate, the ridge identification substrate includes a base substrate and photosensitive devices arranged on a side of the base substrate in an array mode; a diaphragm layer on a side where the ridge identification substrate has the plurality of photosensitive devices, the diaphragm layer includes light transmittance holes in an array mode, orthographic projections of the light transmittance holes are in orthographic projections of the photosensitive devices on the base substrate, a ratio of depths of the light transmittance holes to maximum apertures of the light transmittance holes is $\geq \frac{1}{6}$ and $\leq 2$; micro-lenses on a side of the diaphragm layer away from the ridge identification substrate, orthographic projections of the micro-lenses cover the orthographic projections of the light transmittance holes on the base substrate.

21 Claims, 21 Drawing Sheets

(56) References Cited

U.S. PATENT DOCUMENTS

| | | | |
|---|---|---|---|
| 2017/0242533 A1 | 8/2017 | Liu et al. | |
| 2017/0372110 A1 | 12/2017 | Uehara et al. | |
| 2019/0018540 A1 | 1/2019 | Ko et al. | |
| 2019/0080138 A1 | 3/2019 | Gao et al. | |
| 2019/0080141 A1 | 3/2019 | Tan | |
| 2020/0380282 A1* | 12/2020 | Schwartz | H10F 39/198 |
| 2021/0286963 A1 | 9/2021 | Gao et al. | |
| 2022/0165835 A1 | 5/2022 | Zhao et al. | |
| 2022/0351538 A1* | 11/2022 | Tago | H10F 39/198 |

FOREIGN PATENT DOCUMENTS

| | | |
|---|---|---|
| CN | 106169059 A | 11/2016 |
| CN | 106355160 A | 1/2017 |
| CN | 106932942 A | 7/2017 |
| CN | 107515435 A | 12/2017 |
| CN | 107545235 A | 1/2018 |
| CN | 108681703 A | 10/2018 |
| CN | 207937986 U | 10/2018 |
| CN | 109240528 A | 1/2019 |
| CN | 211236934 U | 8/2020 |
| CN | 211554547 U | 9/2020 |
| CN | 112084996 A | 12/2020 |
| CN | 212112505 U | 12/2020 |
| CN | 112420799 A | 2/2021 |
| CN | 113128319 A | 7/2021 |
| CN | 114019707 A | 2/2022 |

\* cited by examiner

RIDGE IDENTIFICATION MODULE, MANUFACTURING METHOD THEREOF AND DISPLAY APPARATUS

CROSS-REFERENCE TO RELATED APPLICATIONS

This application is a National Stage of International Application No. PCT/CN2022/082287, filed Mar. 22, 2022, which is hereby incorporated by reference in its entirety.

FIELD

The present disclosure relates to the technical field of display, in particular to a ridge identification module, a manufacturing method thereof and a display apparatus.

BACKGROUND

With the rapid development of an information industry, a biometric identification technology has been applied more and more widely, particularly, since different users have different fingerprints, and user identity verification is conveniently performed, the fingerprint identification technology has been widely applied to a plurality of fields such as mobile terminals and smart home, which provides a security guarantee for user information.

SUMMARY

Embodiments of the present disclosure provide a ridge identification module, a manufacturing method thereof and a display apparatus, and a specific solution is as follows.

In one aspect, an embodiment of the present disclosure provides a ridge identification module, including: a ridge identification substrate, including a base substrate and a plurality of photosensitive devices arranged on a side of the base substrate in an array mode; a diaphragm layer, located on a side where the ridge identification substrate has the plurality of photosensitive devices, wherein a quantity of the diaphragm layer is one, the diaphragm layer includes light transmittance holes distributed in an array mode, orthographic projections of the light transmittance holes on the base substrate are located in orthographic projections of the photosensitive devices on the base substrate, and a ratio of depths of the light transmittance holes to maximum apertures of the light transmittance holes is greater than or equal to 1/6 and less than or equal to 2; and a plurality of micro-lenses, located on a side of the diaphragm layer away from the ridge identification substrate, wherein orthographic projections of the micro-lenses on the base substrate cover the orthographic projections of the light transmittance holes on the base substrate.

In some embodiments, in the ridge identification module provided by the embodiment of the present disclosure, the apertures of the light transmittance holes are approximately the same in a direction of the ridge identification substrate pointing to the diaphragm layer.

In some embodiments, in the ridge identification module provided by the embodiment of the present disclosure, the apertures of the light transmittance holes are gradually increased in the direction of the ridge identification substrate pointing to the diaphragm layer.

In some embodiments, in the ridge identification module provided by the embodiment of the present disclosure, maximum apertures $d_1$ of the light transmittance holes and minimum apertures $d_2$ of the light transmittance holes meet a following relation:

$$d_1 = D*h/H + d_2;$$

D is apertures of the micro-lenses, h is depths of the light transmittance holes, and H is a distance between a surface of a side of the ridge identification substrate facing the diaphragm layer and a surface of a side of the micro-lenses facing the diaphragm layer.

In some embodiments, in the ridge identification module provided by the embodiment of the present disclosure, 1 µm≤D≤50 µm, 2 µm≤h≤8 µm, 4 µm≤$d_1$≤12 µm, 1 µm≤$d_2$≤6 µm, and 40 µm≤H≤160 µm.

In some embodiments, the ridge identification module provided by the embodiment of the present disclosure further includes a transparent filling layer located between the diaphragm layer and a layer where the plurality of micro-lenses are located; and
the distance H between the surface of the side of the ridge identification substrate facing the diaphragm layer and the surface of the side of the micro-lenses facing the diaphragm layer meets a following relation:

$$H = [D^2/(8h_x) + h_x/2]/(n_x - 1) - n*h_x/n_x;$$

$h_x$ is vector heights of the micro-lenses, n is a refractive index of a material used by the micro-lenses, and $n_x$ is a refractive index of the transparent filling layer.

In some embodiments, in the ridge identification module provided by the embodiment of the present disclosure, 2 µm≤$h_x$≤16 µm, 1.4 µm≤$n_x$≤1.8 µm, and 1.5 µm≤n≤2.2 µm.

In some embodiments, in the ridge identification module provided by the embodiment of the present disclosure, the micro-lenses are in one-to-one correspondence with the light transmittance holes, centers of the orthographic projections of the micro-lenses on the base substrate approximately coincide with centers of the orthographic projections of the corresponding light transmittance holes on the base substrate.

In some embodiments, in the ridge identification module provided by the embodiment of the present disclosure, each micro-lens includes a convex surface and a flat surface, and the convex surface is located on a side of the flat surface away from the light transmittance holes.

In some embodiments, the ridge identification module provided by the embodiment of the present disclosure further includes an infrared cut coating located between the diaphragm layer and the ridge identification substrate.

In some embodiments, in the ridge identification module provided by the embodiment of the present disclosure, the base substrate includes a ridge identification region and a bezel region located on at least one side of the ridge identification region; and the ridge identification substrate further includes shielding electrodes located on a side of a layer where the plurality of photosensitive devices are located away from the base substrate, the shielding electrodes are located in a display region and the bezel region, and each shielding electrode includes a plurality of hollowed-out structures in the bezel region.

In some embodiments, in the ridge identification module provided by the embodiment of the present disclosure, an area of an orthographic projection of the hollowed-out structure on an outmost side on the base substrate is greater than areas of orthographic projections of the remaining hollowed-out structures on the base substrate in an extension direction of the bezel region.

In some embodiments, in the ridge identification module provided by the embodiment of the present disclosure, the plurality of photosensitive devices are arranged in the ridge identification region in an array mode, and the plurality of hollowed-out structures and all the photosensitive devices are arranged in the same row or column.

In some embodiments, in the ridge identification module provided by the embodiment of the present disclosure, all the hollowed-out structures located on the same row or column with the photosensitive devices are arranged in a mutually independent or communicating mode.

In some embodiments, the ridge identification module provided by the embodiment of the present disclosure further includes a plurality of grid lines and a plurality of data lines arranged in a crossed mode, and the plurality of grid lines and the plurality of data lines extend to a side of the shielding electrodes away from the ridge identification region from the ridge identification region.

In some embodiments, in the ridge identification module provided by the embodiment of the present disclosure, the ridge identification substrate further includes bias electrodes located between the layer where the plurality of photosensitive devices are located and a layer where the shielding electrodes are located, and the bias electrodes are electrically connected with the shielding electrodes.

In some embodiments, in the ridge identification module provided by the embodiment of the present disclosure, orthographic projections of the bias electrodes on the base substrate approximately coincide with orthographic projections of the shielding electrodes on the base substrate.

In some embodiments, in the ridge identification module provided by the embodiment of the present disclosure, the ridge identification substrate further includes resistance reduction electrodes located between a layer where the bias electrodes are located and the base substrate, and the resistance reduction electrodes are electrically connected with the shielding electrodes through the bias electrodes.

In some embodiments, in the ridge identification module provided by the embodiment of the present disclosure, the resistance reduction electrodes are located in the bezel region, and in the bezel region, orthographic projections of the resistance reduction electrodes on the base substrate approximately coincide with the orthographic projections of the shielding electrodes on the base substrate.

In some embodiments, in the ridge identification module provided by the embodiment of the present disclosure, the resistance reduction electrodes are located in the bezel region, and in the bezel region, the resistance reduction electrodes are arranged in a whole surface mode in an area where the shielding electrodes are located.

In some embodiments, in the ridge identification module provided by the embodiment of the present disclosure, each photosensitive device includes a first electrode, a photoelectric conversion layer and a second electrode which are arranged in a stacked mode, the first electrode is arranged close to the base substrate, and the resistance reduction electrode and the first electrode are arranged on the same layer.

In some embodiments, the ridge identification module provided by the embodiment of the present disclosure further includes a plurality of transistors located between the photoelectric conversion layers and the base substrate, and the first electrodes and first poles of the transistors are reused.

In some embodiments, the ridge identification module provided by the embodiment of the present disclosure further includes the plurality of transistors located between the photoelectric conversion layers and the base substrate, a layer where the first electrodes are located is located on a side of the first poles of the transistors away from the base substrate, and the first electrodes are electrically connected with the first poles of the transistors.

In some embodiments, in the ridge identification module provided by the embodiment of the present disclosure, the ridge identification substrate further includes a plurality of binding electrodes, the plurality of binding electrodes are located on a side of the shielding electrodes away from the ridge identification region, and the plurality of binding electrodes and the first electrodes are arranged on the same layer.

In some embodiments, in the ridge identification module provided by the embodiment of the present disclosure, the bezel region surrounds the ridge identification region, and the bezel region includes a first bezel region configured to bind a bas voltage chip; each binding electrode includes a first binding electrode located in the first bezel region; and the ridge identification substrate further includes first connection electrodes arranged on the same layer as the bias electrodes at the first binding electrodes, and the first binding electrodes are electrically connected with the bias electrodes through the first connection electrodes.

In some embodiments, in the ridge identification module provided by the embodiment of the present disclosure, the first bezel region is further configured to bind a data drive chip; each binding electrode further includes a second binding electrode located in the first bezel region; and the ridge identification substrate further includes second connection electrodes arranged on the same layer as the first poles of the transistors at the second binding electrodes, and the second binding electrodes are electrically connected with second poles of the transistors through the second connection electrodes.

In some embodiments, in the ridge identification module provided by the embodiment of the present disclosure, the bezel region further includes a second bezel region configured to bind a gate drive chip, and the second bezel region is connected with the first bezel region; each binding electrode further includes a third binding electrode located in the second bezel region; and the ridge identification substrate further includes corresponding electrically-connected third connection electrodes located in a layer where the first poles of the transistors are located and a layer where gates of the transistors are located at the third binding electrodes, and the third binding electrodes are electrically connected with the gates of the transistors through the third connection electrodes.

In another aspect, an embodiment of the present disclosure provides a manufacturing method of the ridge identification module, including: providing a substrate; forming a diaphragm layer having a plurality of light transmittance holes distributed in an array mode on the substrate; forming a plurality of micro-lenses covering the plurality of light transmittance holes on the diaphragm layer; peeling off the substrate; and providing a ridge identification substrate, and fixing a side where the diaphragm layer is located to a light incident side of the ridge identification substrate.

In some embodiments, in the above manufacturing method provided by the embodiment of the present disclosure, forming the diaphragm layer and the plurality of micro-lenses specifically includes: adopting an embossing or patterning process to form the diaphragm layer and the plurality of micro-lenses.

In another aspect, an embodiment of the present disclosure provides a display apparatus, including a display module, a ridge identification module and an adhesive layer, wherein the ridge identification module is the ridge identification module provided by the embodiment of the present disclosure, the ridge identification module is located on an opposite side of a display side of the display module, the adhesive layer is located between the display module and the ridge identification module, and an orthographic projection of the adhesive layer on the display module surrounds a display region of the display module.

DETAILED DESCRIPTION OF THE EMBODIMENTS

Figure 1:
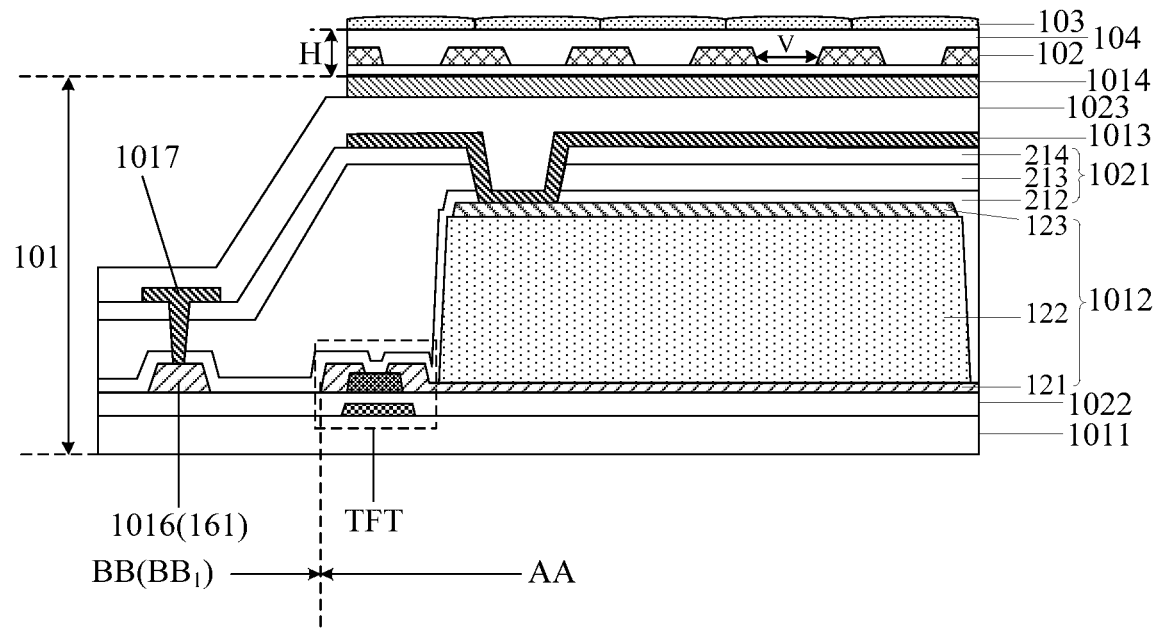
FIG. 1 is a schematic structural diagram of a ridge identification module provided by an embodiment of the present disclosure.

To make the objectives, technical solutions and advantages of embodiments of the present disclosure clearer, the technical solutions of the embodiments of the present disclosure will be clearly and fully described below with reference to the accompanying drawings of the embodiments of the present disclosure. It should be noted that the size and shape of each figure in the accompanying drawings do not reflect a true scale, and are only intended to schematically illustrate the content of the present disclosure, and the same or similar reference numerals indicate the same or similar elements or elements having the same or similar functions all the time.

Unless otherwise defined, technical or scientific terms used herein shall have the ordinary meanings understood by those ordinarily skilled in the art to which the present disclosure pertains. "First", "second" and similar words used in the specification and claims of the present disclosure do not show any order, quantity or importance, and are merely used to distinguish different components. "Comprise", "include" or similar words indicate that an element or item appearing before such words covers listed elements or items appearing after the words and equivalents thereof, and do not exclude other elements or items. "Inner", "outer", "upper", "lower", etc. are merely used to show a relative position relation, and when an absolute position of a described object is changed, the relative position relation may also be correspondingly changed.

The market share of a full screen is gradually increased, fingerprint identification demands are increased year by year, fingerprint identification demands under an optical large-area screen gradually appear, and in the related art, a fingerprint identification module is arranged under the full screen to achieve under-screen fingerprint identification. Specifically, an existing fingerprint identification module adopts at least two diaphragm layers on a fingerprint identification substrate to collimate fingerprint reflection rays collected by micro-lenses, and then the fingerprint identification substrate collects the collimated rays to achieve fingerprint identification. However, the adjacent diaphragm layers need to be spaced through a thicker transparent filling layer, and therefore this solution cannot meet a development tendency of product thinning.

Figure 2:
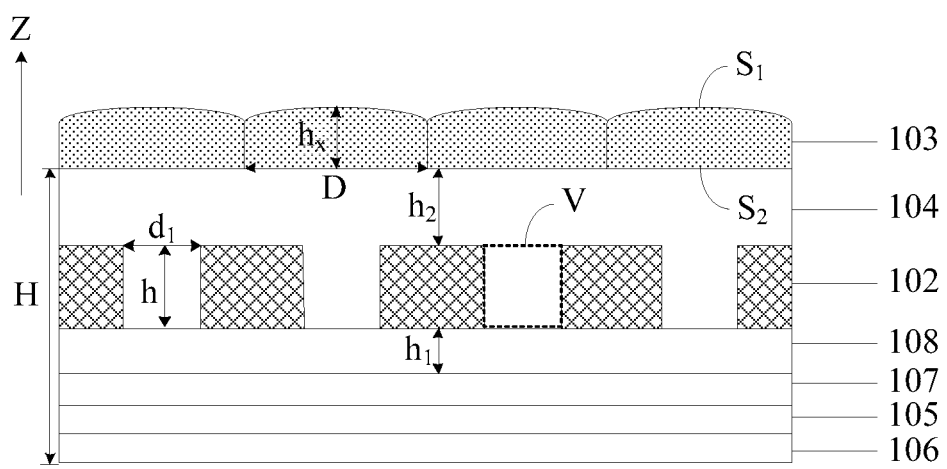
FIG. 2 is a schematic structural diagram of a film located on a light incident side of a ridge identification substrate in a ridge identification module provided by an embodiment of the present disclosure.

In order to solve the above technical problems existing in the related art, an embodiment of the present disclosure provides a ridge identification module, as shown in FIG. 1 and FIG. 2, including:

- a ridge identification substrate 101, wherein the ridge identification substrate 101 includes a base substrate 1011 and a plurality of photosensitive devices 1012 arranged on a side of the base substrate 1011 in an array mode; optionally, the base substrate 1011 may be a flexible base substrate, such as a polyimide (PI) substrate; or the base substrate 1011 may be a rigid base substrate, such as a glass (Glass) substrate; each photosensitive device 1012 may include a first electrode 121, a photoelectric conversion layer 122 and a second electrode 123 which are arranged in a stacked mode, and the photoelectric conversion layer 122 may be of a PIN structure, and specifically may include a P-type semiconductor layer, an I-type semiconductor layer (also known as an intrinsic semiconductor layer) and an N-type semiconductor layer; the P-type semiconductor layer is located between the first electrode 121 and the I-type semiconductor layer, and the N-type semiconductor layer is located between the I-type semiconductor layer and the second electrode 123; or, the N-type semiconductor layer is located between the first electrode 121 and the I-type semiconductor layer, and the P-type semiconductor layer is located between the I-type semiconductor layer and the second electrode 123, which is not limited here;
- a diaphragm layer 102, located on a side (equivalent to a light incident side of the ridge identification substrate 101) where the ridge identification substrate 101 has the plurality of photosensitive devices 1012, wherein a quantity of the diaphragm layer 102 is one, the diaphragm layer 102 includes light transmittance holes V distributed in an array mode, orthographic projections of the light transmittance holes V on the base substrate 1011 are located in orthographic projections of the photosensitive devices 1012 on the base substrate 1011, optionally, one photosensitive device 1012 may correspond to at least one light transmittance hole V, and a ratio (namely, a depth-to-width ratio) of depths h of the light transmittance holes V to maximum apertures $d_1$ of the light transmittance holes V is greater than or equal to ⅙ and less than or equal to 2; and optionally, a material of the diaphragm layer 102 may be light shielding materials such as black resin, molybdenum oxide, alumina or chromium metal; and
- a plurality of micro-lenses 103, located on a side of the diaphragm layer 102 away from the ridge identification substrate 101, wherein orthographic projections of the micro-lenses 103 on the base substrate 1011 cover the orthographic projections of the light transmittance holes V on the base substrate 1011; and optionally, a material of the micro-lenses 103 may be transparent resin.

In the ridge identification module provided by the embodiment of the present disclosure, only one diaphragm layer 102 is arranged, which not only reduces the quantity of diaphragm layers 102, but also saves a transparent filling layer between the diaphragm layers 102 compared with a technical solution that two or more diaphragm layers 102 are arranged in the related art, and accordingly, a whole thickness of the ridge identification module may be effectively reduced, which is beneficial to achieving thinning design of the ridge identification module. Moreover, since the ratio of the depths h of the light transmittance holes V to the maximum apertures $d_1$ of the light transmittance holes V is greater than or equal to ⅙ and less than or equal to 2, the diaphragm layer 102 may make a good collimation effect on the fingerprint reflection rays collected by the micro-lenses 103, and therefore, a good fingerprint identification effect may be considered while thinning is achieved.

Figure 3:
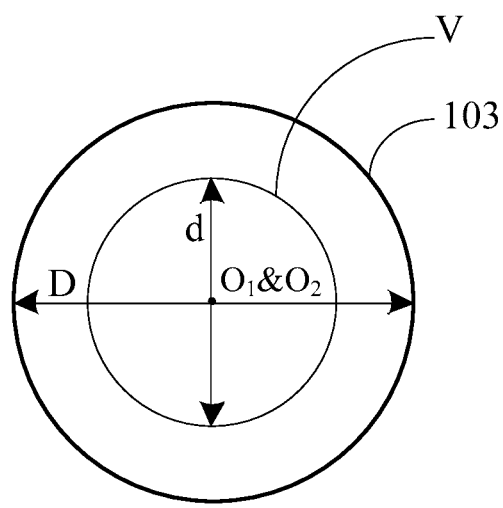
FIG. 3 is a schematic structural diagram of micro-lenses and light transmittance holes in FIG. 2.
Figure 4:
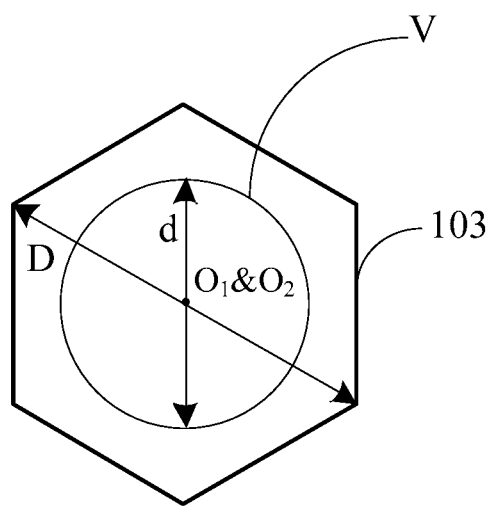
FIG. 4 is yet another schematic structural diagram of micro-lenses and light transmittance holes in FIG. 2.
Figure 5:
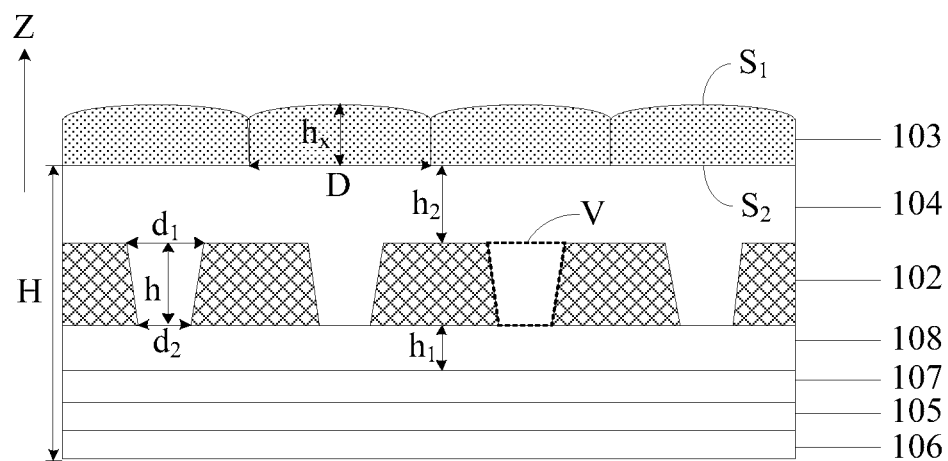
FIG. 5 is yet another schematic structural diagram of a film located on a light incident side of a ridge identification substrate in a ridge identification module provided by an embodiment of the present disclosure.
Figure 6:
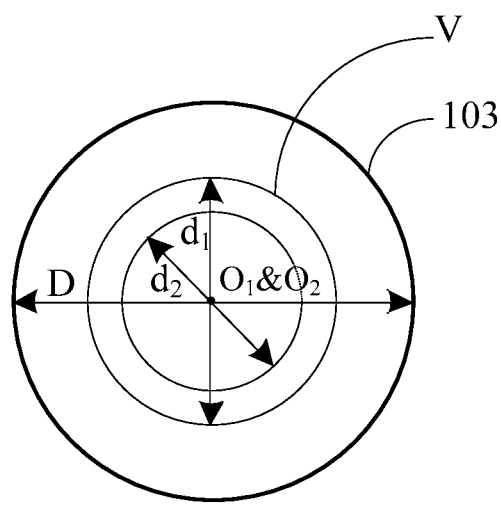
FIG. 6 is a schematic structural diagram of micro-lenses and light transmittance holes in FIG. 5.
Figure 7:
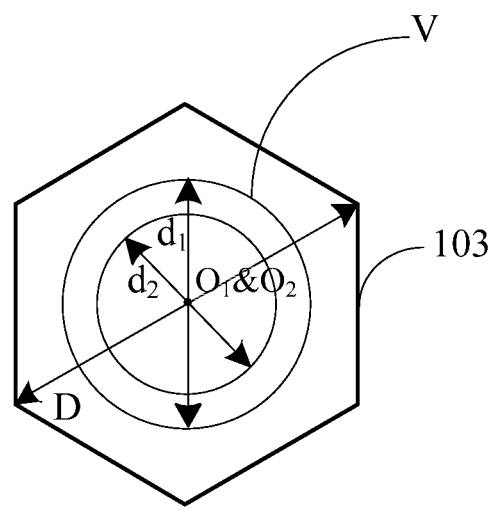
FIG. 7 is yet another schematic structural diagram of micro-lenses and light transmittance holes in FIG. 5.

In some embodiments, as shown in FIG. 2 to FIG. 4, the apertures d of the light transmittance holes V are approximately the same in a direction Z of the ridge identification substrate 101 pointing to the diaphragm layer 102, for example, exactly the same or within an error range caused by factors such as manufacturing and measuring. Or, as shown in FIG. 5 to FIG. 7, the apertures of the light transmittance holes V may be gradually increased in the direction Z of the ridge identification substrate 101 pointing to the diaphragm layer 102, and in other words, the light transmittance holes V have minimum apertures $d_2$ close to the ridge identification substrate 101 and maximum apertures $d_1$ away from the ridge identification substrate 101. In the present disclosure, the apertures d of the light transmittance holes V with uniform apertures may be equal to the maximum apertures $d_1$. Optionally, to ensure fingerprint identification quality, the maximum apertures $d_1$ of the light transmittance holes V and the minimum apertures $d_2$ of the light transmittance holes V meet a following relation:

$$d_1 = D*h/H + d_2;$$

as shown in FIG. 1, FIG. 2 and FIG. 5, D is apertures of the micro-lenses 103, h is depths of the light transmittance holes V, and H is a distance between a surface of a side of the ridge identification substrate 101 facing the diaphragm layer 102 and a surface of a side of the micro-lenses 103 facing the diaphragm layer 102. In some embodiments, 1 µm≤D≤50 µm, 2 µm≤h≤8 µm, 4 µm≤$d_1$≤12 µm, 1 µm≤$d_2$≤6 µm, and 40 µm≤H≤160 µm.

In some embodiments, to improve a center transmittance of the light transmittance holes V and effectively prevent crosstalk caused by stray light, as shown in FIG. 1, FIG. 2 and FIG. 5, the ridge identification module provided by the embodiment of the present disclosure may further include a transparent filling layer 104 located between the diaphragm layer 102 and a layer where the plurality of micro-lenses 103 are located; and the distance H between the surface of the side of the ridge identification substrate 101 facing the diaphragm layer 102 and the surface of the side of the micro-lenses 103 facing the diaphragm layer 102 meets a following relation:

$$H = [D^2/(8h_x) + h_x/2]/(n_x - 1) - n*h_x/n_x;$$

$h_x$ is vector heights of the micro-lenses 103, n is a refractive index of a material used by the micro-lenses 103, and $n_x$ is a refractive index of the transparent filling layer 104. Optionally, 2 µm≤$h_x$≤16 µm, 1.4 µm≤$n_x$≤1.8 µm, and 1.5 µm≤n≤2.2 µm.

Figure 8:
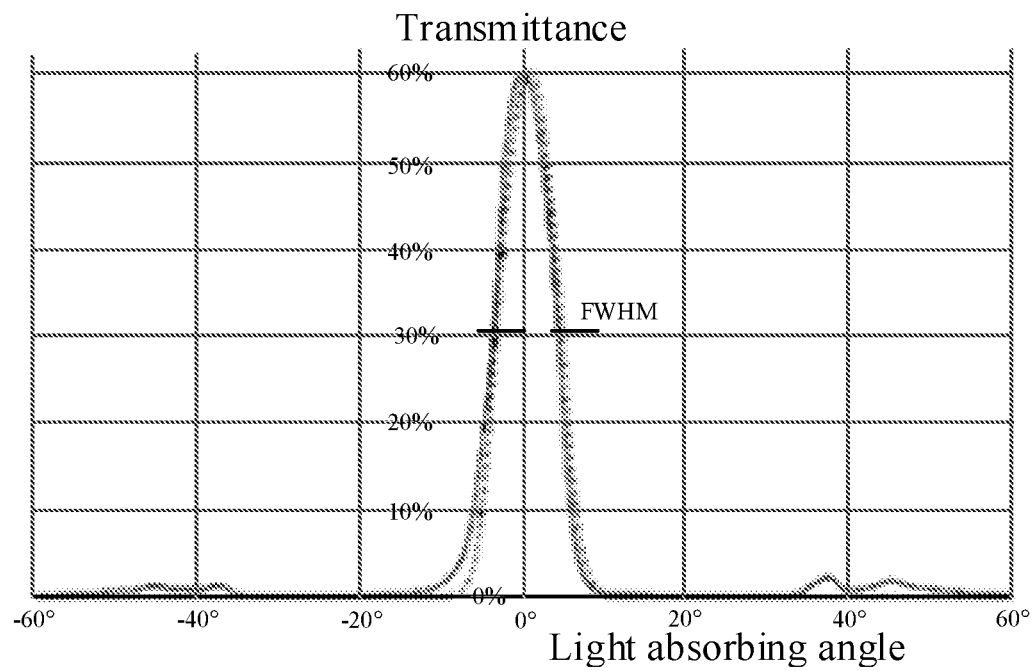
FIG. 8 is a light absorbing angle curve of a ridge identification module shown in FIG. 2.
Figure 9:
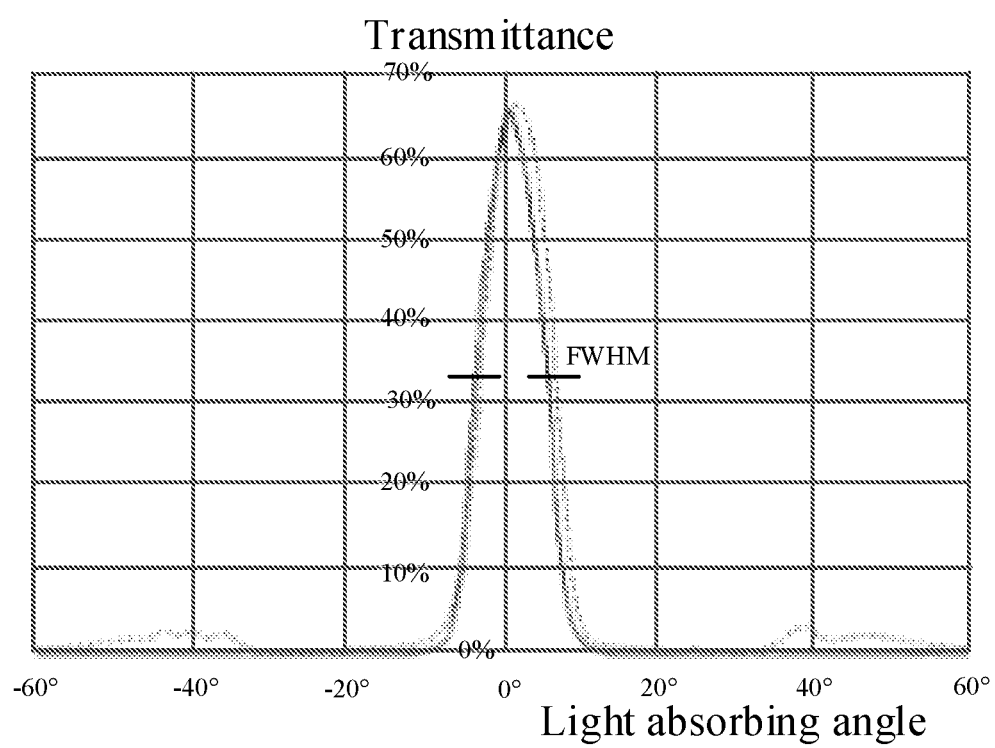
FIG. 9 is alight absorbing angle curve of a ridge identification module shown in FIG. 5.

FIG. 8 shows a light absorbing angle curve in a case that the above parameter relations are met, and the light transmittance holes V are in shapes shown in FIG. 2, and FIG. 9 shows a light absorbing angle curve in a case that the above parameter relations are met, and the light transmittance holes V are in shapes shown in FIG. 5. When full width at half maxima (FWHM) of the light absorbing angle curves in FIG. 8 and FIG. 9 both may be up to 7°~8°, the center transmittance (namely, peak values of the light absorbing angle curves) is about 60%. FWHM represent a core index of a fingerprint identification effect, generally, in order to meet the fingerprint identification requirement, the FWHM are required to be within 8°, an area enclosed by the light absorbing angle curves and horizontal ordinates is a fingerprint semaphore received by the photosensitive devices 1012, the higher the fingerprint semaphore is, the higher the identification precision will be, and therefore, it is usually required that in a case that the FWHM are fixed, the higher the center transmittance of the light transmittance holes V, the better. In the related art, a ridge identification module with two or more diaphragm layers 102 is adopted, and under the condition of meeting the FWHM within 8°, the corresponding center transmittance is about 42%. It can be known through comparison that compared with the related art, the center transmittance of the present disclosure is increased by about 18%, which is beneficial to improving the fingerprint identification precision.

In some embodiments, in the ridge identification module provided by the embodiment of the present disclosure, as shown in FIG. 2 to FIG. 7, the micro-lenses 103 are in one-to-one correspondence with the light transmittance holes V, centers $O_1$ of the orthographic projections of the micro-lenses 103 on the base substrate 1011 approximately coincide with centers $O_2$ of the orthographic projections of the light transmittance holes V on the base substrate 1011, for example, exactly coinciding or within an error range caused by factors such as manufacturing and measuring. Therefore, the fingerprint reflection light collected by the micro-lenses 103 is all incident into the photosensitive devices 1012 through the light transmittance holes V, so as to improve the semaphore and increase a signal-to-noise ratio. Certainly, during specific implementation, one micro-lens 103 may further correspond to at least two light transmittance holes V, which is not specifically limited here. In some embodiments, each micro-lens 103 may include a convex surface $S_1$ and a flat surface $S_2$, and the convex surface $S_1$ is located on a side of the flat surface $S_2$ away from the light transmittance holes V, so that the micro-lenses 103 may effectively collect the fingerprint reflection light to the corresponding light transmittance holes V. Optionally, shapes of the orthographic projections of the micro-lenses 103 on the base substrate 1011 may be circles shown in FIG. 3 and FIG. 6, and may also be hexagons shown in FIG. 4 and FIG. 7, which is not limited here.

In some embodiments, the ridge identification module provided by the embodiment of the present disclosure, as shown in FIG. 2 and FIG. 5, may further include an infrared cut coating (IR cut) 105 located between the diaphragm layer 102 and the ridge identification substrate 101, the infrared cut coating 105 may precisely control a center wavelength to be within a visible light range (380 nm-600 nm) lower than 600 nm, that is, the infrared cut coating 105 only allows rays of 380 nm-600 nm to pass through, and rays higher than 600 nm will be absorbed. Since rays above 600 nm in ambient light may pass through fingers to be irradiated to the micro-lenses 103, the rays are collected by the photosensitive devices 1012 via the light transmittance holes V to interfere with the fingerprint identification effect. Therefore, the infrared cut coating 105 is arranged between the diaphragm layer 102 and the ridge identification substrate 101, which may effectively avoid interference of the ambient light and improve the fingerprint identification effect.

Optionally, as shown in FIG. 1, FIG. 2 and FIG. 5, the infrared cut coating 105 and the ridge identification substrate 101 are bonded and fixed through a first adhesive layer 106, and the infrared cut coating 105 and the diaphragm layer 102 are bonded and fixed through a second adhesive layer 107. To provide a flat manufacturing surface for the diaphragm layer 102, a second transparent filling layer 108 may further be arranged between the diaphragm layer 102 and the second adhesive layer 107. In some embodiments, materials of the first adhesive layer 106 and the second adhesive layer 107 may be OCA, OCR, etc.

In some embodiments, as shown in FIG. 1 and FIG. 10 to FIG. 12, the base substrate 1011 includes a ridge identification region AA and a bezel region BB located on at least one side of the ridge identification region AA; and the ridge identification substrate 101 further includes shielding electrodes 1013 located on a side of a layer where the plurality of photosensitive devices 102 are located away from the base substrate 101, the shielding electrodes 1013 are located in the ridge identification region AA and the bezel region BB, and in the bezel region BB, each shielding electrode 1013 includes a plurality of first hollowed-out structures $K_1$, so as to reduce voltage drop (RC loading) of the shielding electrodes 1013, and improve uniformity of potentials on the shielding electrodes 1013.

Figure 10:
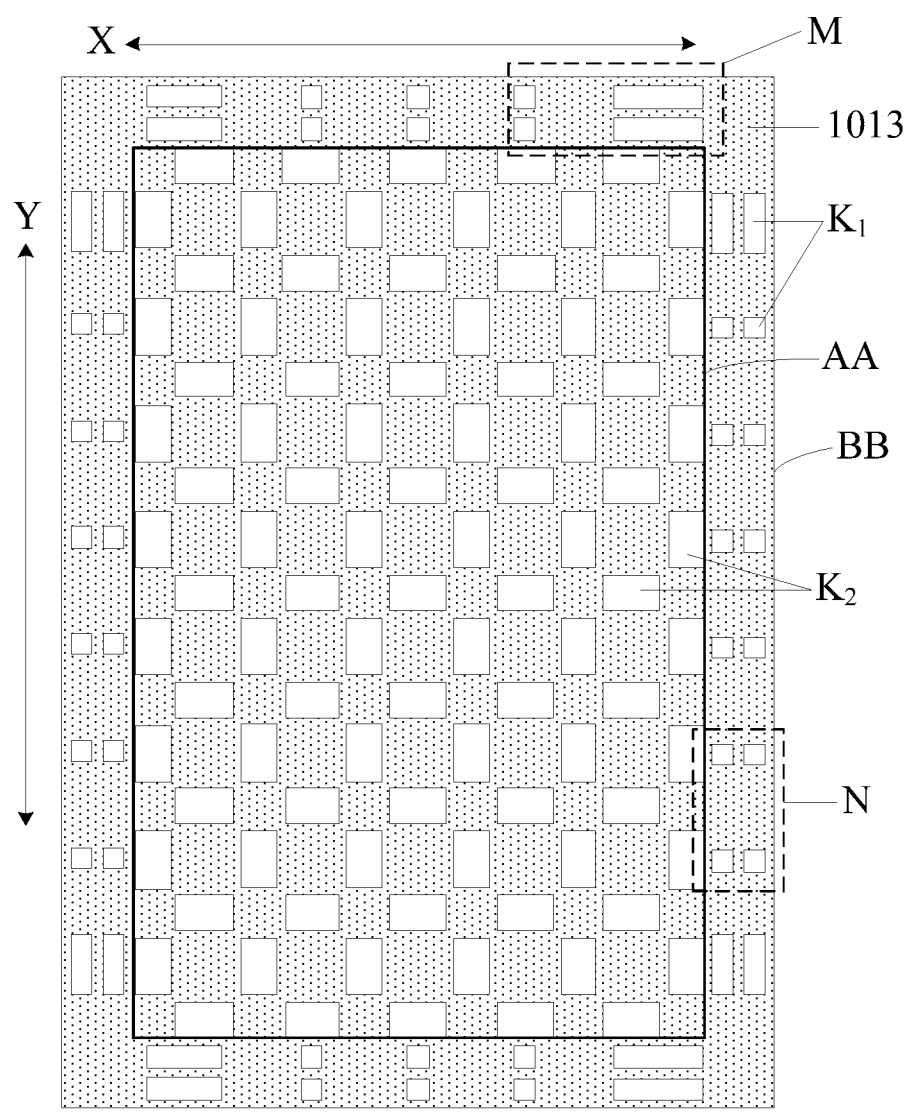
FIG. 10 is a schematic structural diagram of shielding electrodes provided by an embodiment of the present disclosure.
Figure 11:
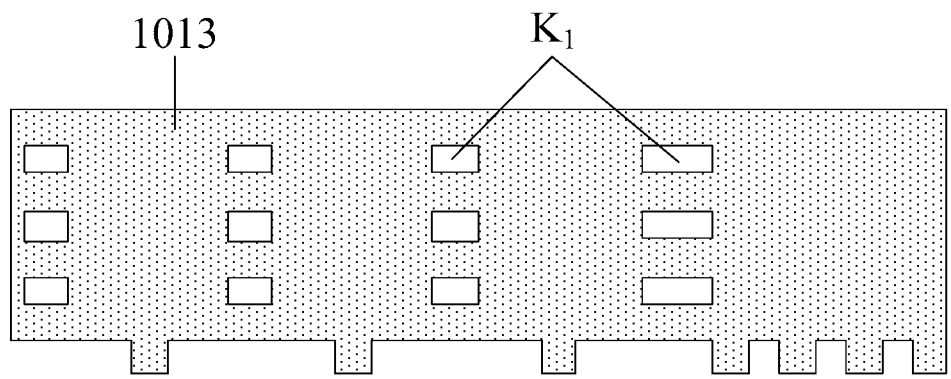
FIG. 11 is an enlarged schematic diagram of a region M in FIG. 10.
Figure 12:
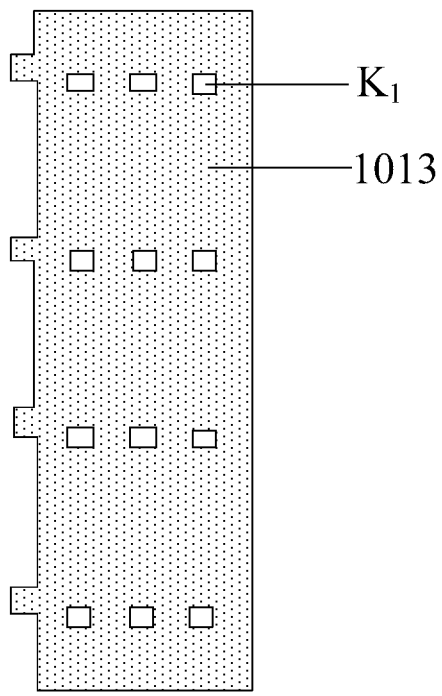
FIG. 12 is an enlarged schematic diagram of a region N in FIG. 10.

In some embodiments, as shown in FIG. 10 to FIG. 12, in the extension direction X/Y of the bezel region BB, an area of an orthographic projection of the first hollowed-out structure $K_1$ on an outmost side on the base substrate 1011 is greater than an area of orthographic projections of the remaining first hollowed-out structures $K_1$ on the base substrate 1011, that is, in the same bezel region BB, the first hollowed-out structures $K_1$ at two ends are larger, and the first hollowed-out structure $K_1$ in the middle is smaller, thus, an area of non-hollowed-out shielding electrodes 1013 at the two ends of the bezel region BB is similar to or the same as that of the non-hollowed-out shielding electrode 1013 in the middle of the bezel region BB, so as to further improve uniformity of potentials on the shielding electrodes 1013.

Figure 13:
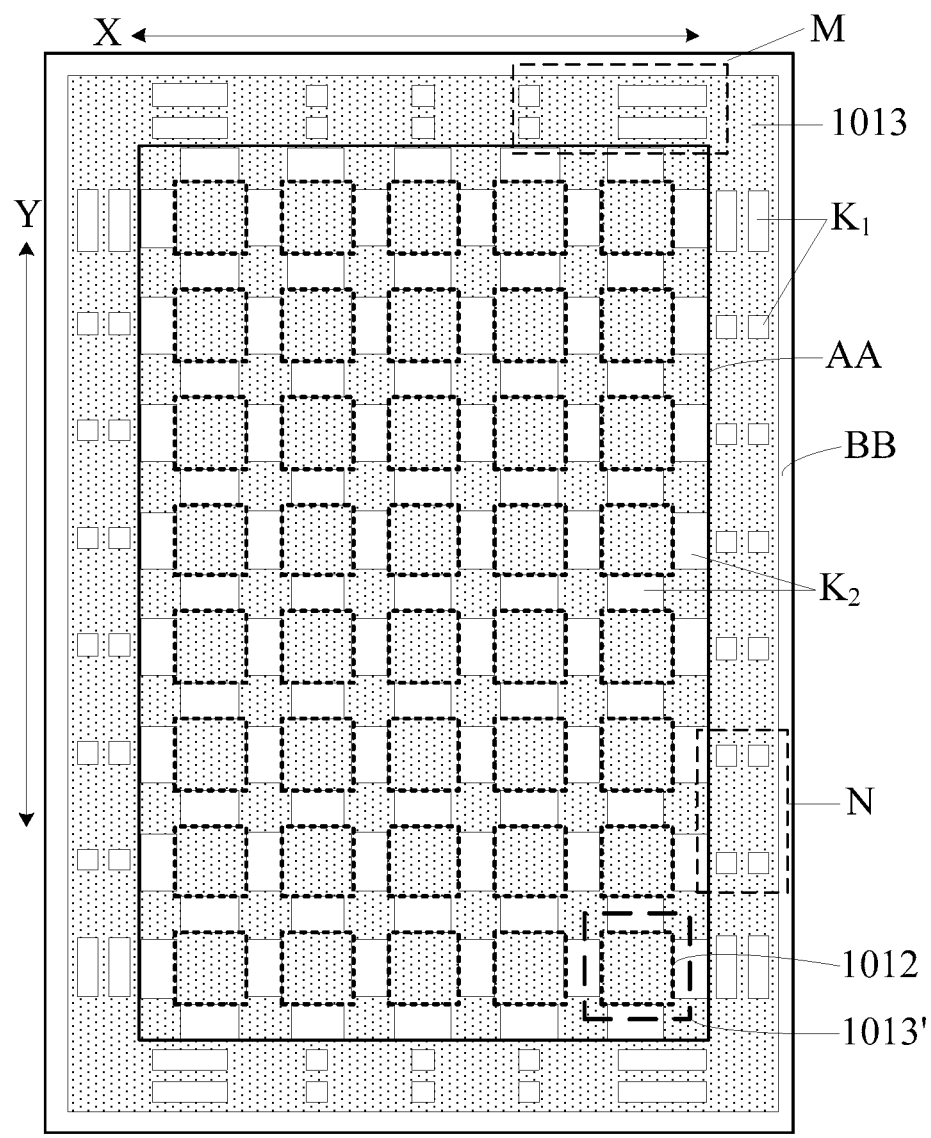
FIG. 13 is a schematic structural diagram of a ridge identification substrate provided by an embodiment of the present disclosure.
Figure 14:
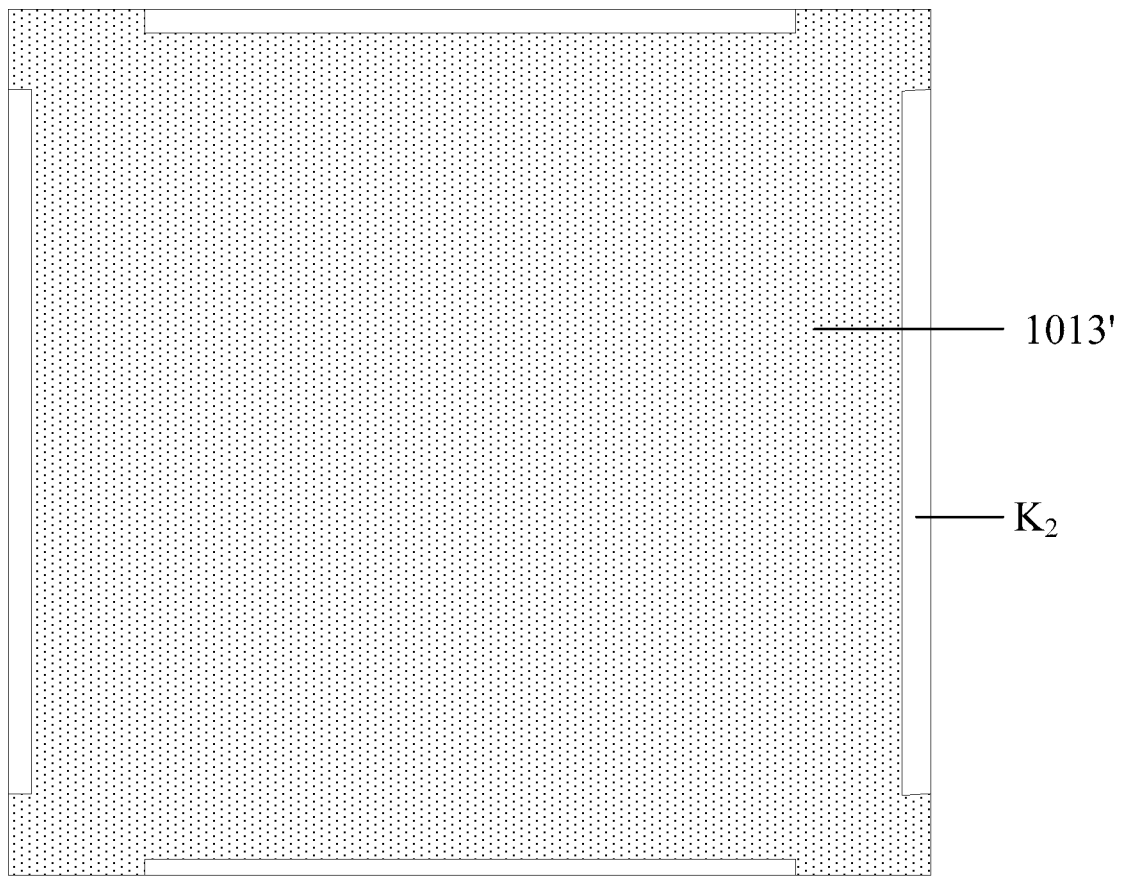
FIG. 14 is a schematic diagram of a shielding structure provided by an embodiment of the present disclosure.
Figure 15:
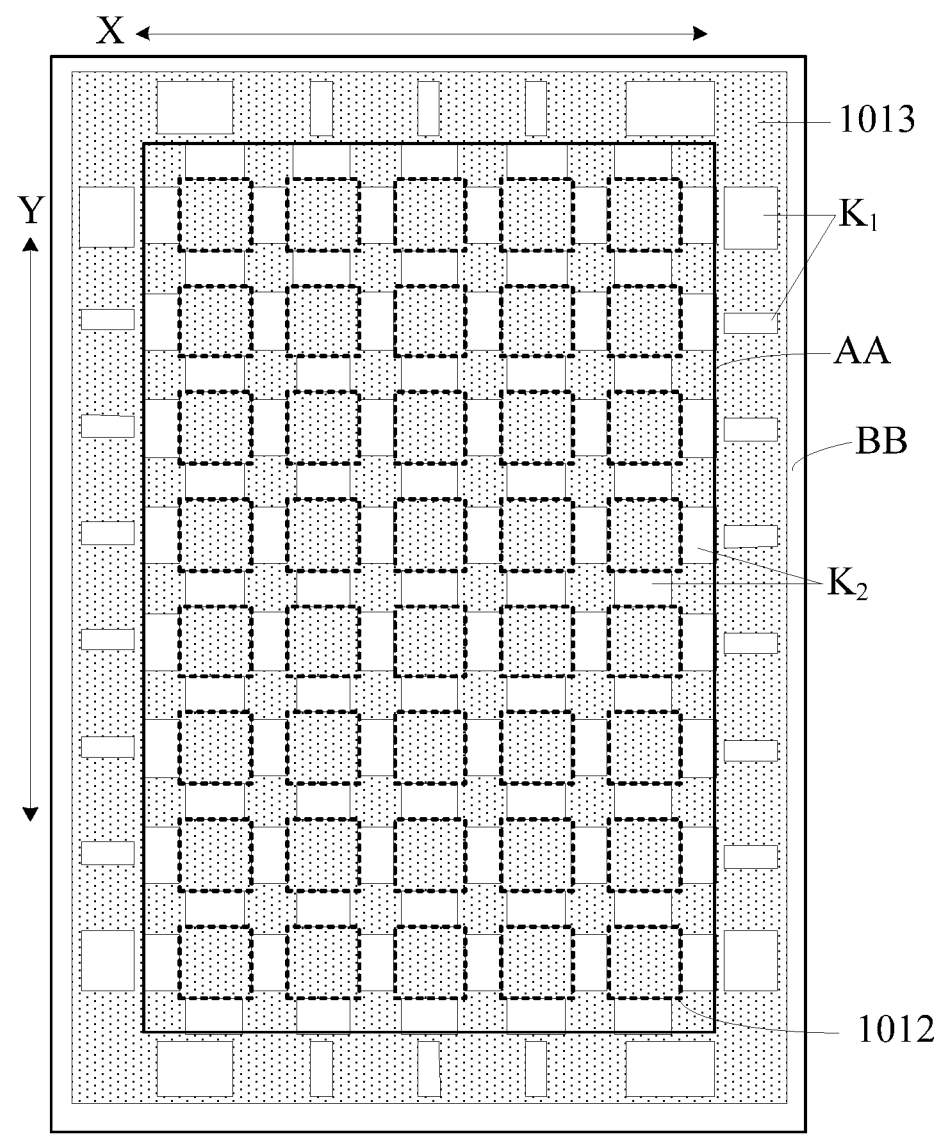
FIG. 15 is another schematic structural diagram of a ridge identification substrate provided by an embodiment of the present disclosure.

In some embodiments, as shown in FIG. 13, the plurality of photosensitive devices 1012 are arranged in the ridge identification region AA in an array mode, the plurality of first hollowed-out structures $K_1$ and all the photosensitive devices 1012 are arranged in the same row or column, and therefore equally-shared areas of the shielding electrodes 1013 in each row and each column are similar or the same, which ensures uniformity of potentials on the shielding electrodes 1013. Optionally, as shown in FIG. 13, all the first hollowed-out structure $K_1$ located in the same row or column with the photosensitive devices 1012 are mutually independent, or, as shown in FIG. 15, all the first hollowed-out structure $K_1$ located in the same row or column with the photosensitive devices 1012 are arranged in a communication mode.

Continuously referring to FIG. 10 and FIG. 13 to FIG. 15, the shielding electrodes 1013 have shielding structures 1013' covering the photosensitive devices 1012 in the ridge identification region AA, so that external electromagnetic interference is shielded through the shielding electrodes 1013. Optionally, to facilitate loading of electric signals for all the shielding structures 1013', all the shielding structures 1013' may be arranged integrally. At the same time, second hollowed-out structures K2 may further be arranged around the shielding structures 1013', and arrangement of the second hollowed-out structures K2 can not only improve uniformity of the potentials on the shielding electrodes 1013, but also effectively reduce coupling capacitances between the shielding electrodes 1013 and signal lines such as grid lines GL and data lines DL below, and mutual interference between the shielding electrodes 1013 and the signal lines such as the grid lines GL and the data lines DL is avoided.

Figure 16:
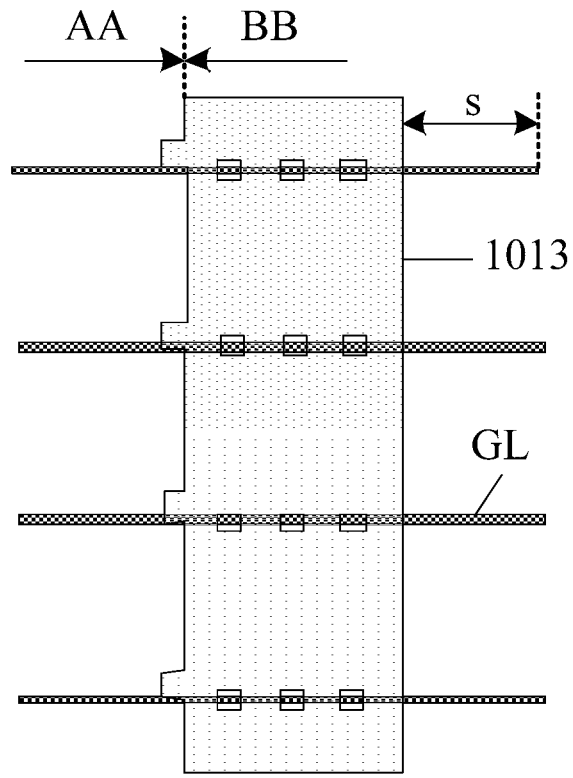
FIG. 16 is an enlarged schematic diagram of a region N in FIG. 13.
Figure 17:
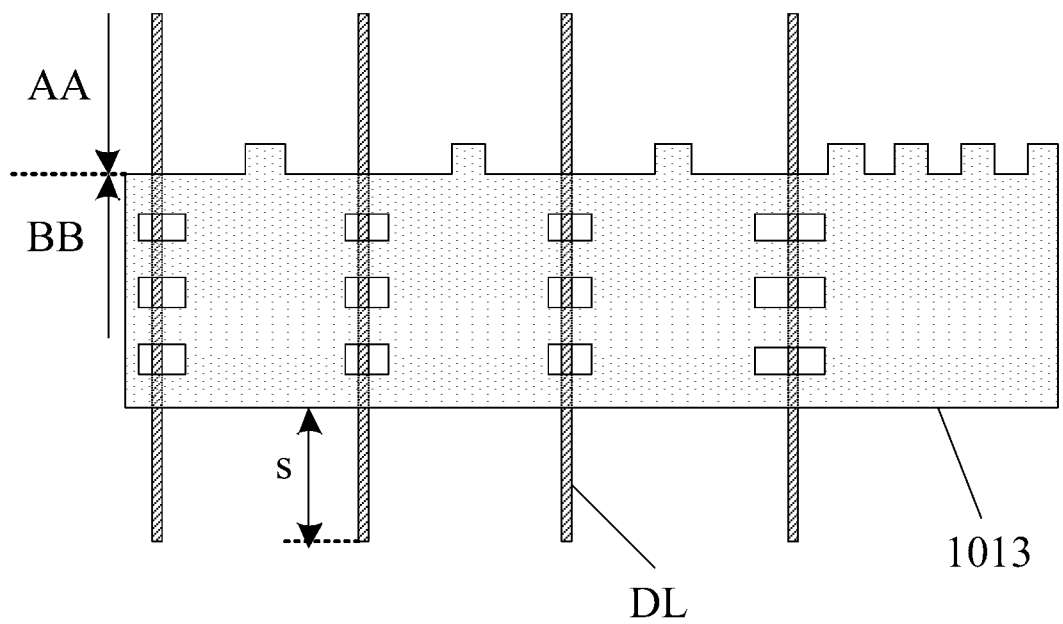
FIG. 17 is an enlarged schematic diagram of a region M in FIG. 13.

In some embodiments, as shown in FIG. 16 and FIG. 17, the plurality of grid lines GL and/or the plurality of data lines DL extend to a side of the shielding electrodes 1013 away from the ridge identification region AA from the ridge identification region AA, so as to facilitate detection of the grid lines GL or the data lines DL on which signals are abnormal (short circuit or open circuit). Optionally, the grid lines GL and/or the data lines DL at least extend by a distance of one pixel relative to the shielding electrodes 1013, and in other words, a distance s between ends of the grid lines GL and/or the data lines DL in the bezel region BB and the shielding electrodes 1013 is greater than or equal to a pitch of one pixel.

Figure 18:
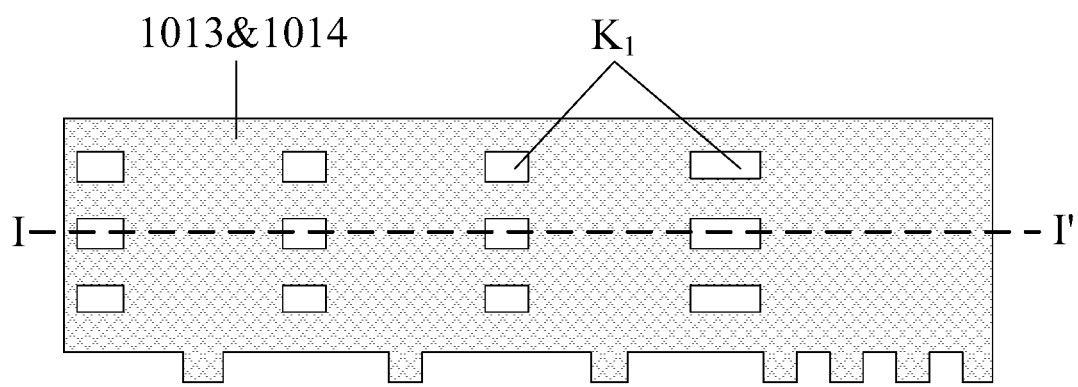
FIG. 18 is a yet another enlarged schematic diagram of a region M in FIG. 13.
Figure 19:
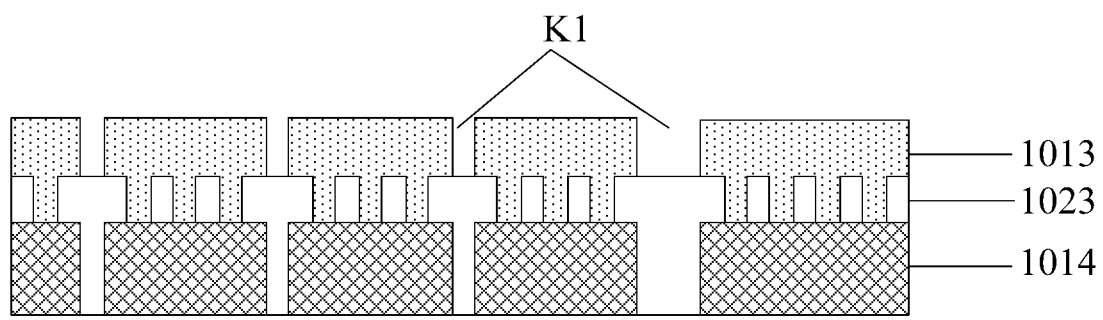
FIG. 19 is a sectional diagram along a line I-I' in FIG. 18.

In some embodiments, as shown in FIG. 18 and FIG. 19, the ridge identification substrate 101 may further include bias electrodes 1014 located between the layer where the plurality of photosensitive device 1012 are located and the layer where the shielding electrodes 1013 are located, the bias electrodes 1014 are electrically connected with the shielding electrodes 1013, and therefore bias voltage signals with fixed potentials are loaded to the shielding electrodes 1013 through the bias electrodes 1014.

In some embodiments, as shown in FIG. 18 and FIG. 19, orthographic projections of the bias electrodes 1014 on the base substrate 1011 may approximately coincide with orthographic projections of the shielding electrodes 1013 on the base structure 1011, that is, exactly coinciding or within an error range caused by factors such as manufacturing and measuring, and thus, one mask may be used for finishing manufacturing of the shielding electrodes 1013 and the bias electrodes 1014, which saves the mask cost. To improve the ray transmittance, the shielding electrodes 1013 and the bias electrodes 1014 all may be made of transparent conductive materials with higher transmittance and smaller resistance, such as indium tin oxide and indium zinc oxide.

Figure 20:
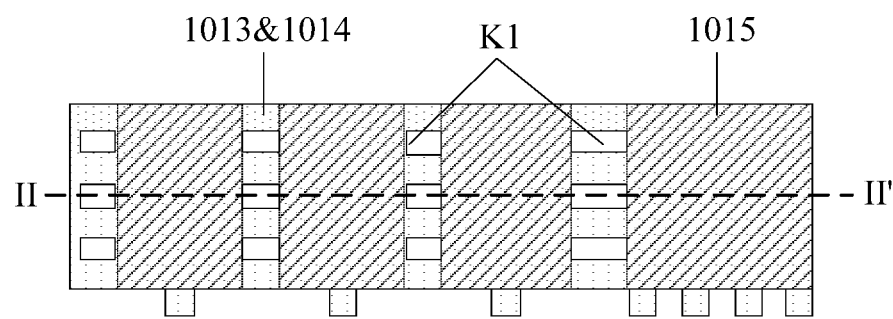
FIG. 20 is yet another enlarged schematic diagram of a region N in FIG. 13.
Figure 21:
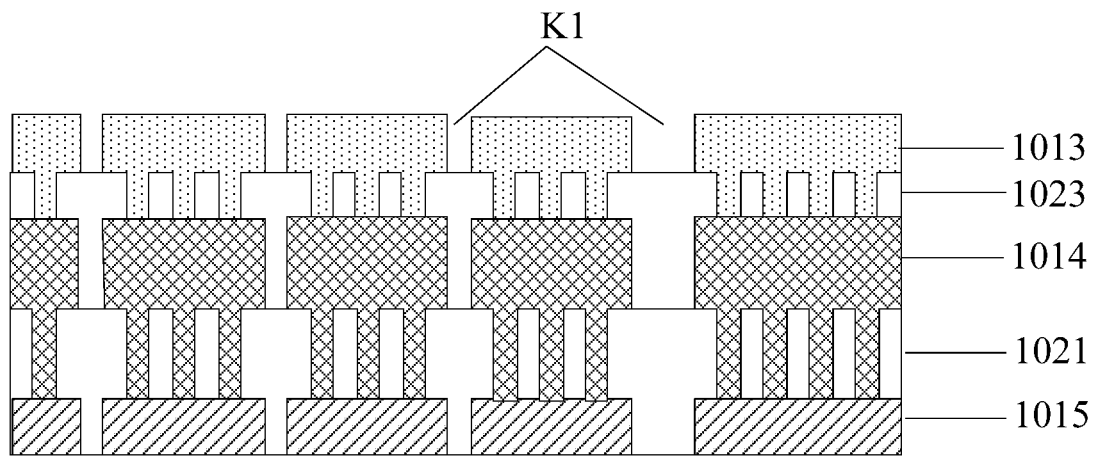
FIG. 21 is a sectional diagram along a line II-II' in FIG. 20.

In some embodiments, as shown in FIG. 13, FIG. 20 and FIG. 21, the ridge identification substrate 101 further includes resistance reduction electrodes 1015 located between a layer where the bias electrodes 1014 are located and the base substrate 1011, and the resistance reduction electrodes 1015 are electrically connected with the shielding electrodes 1013 through the bias electrodes 1014 so as to further reduce the pressure drop of the shielding electrodes 1013 and improve uniformity of the potentials on the shielding electrodes 1013.

In some embodiments, as shown in FIG. 13, FIG. 20 and FIG. 21, the resistance reduction electrodes 1015 are located in the bezel region BB, and orthographic projections of the resistance reduction electrodes 1015 on the base substrate 1011 approximately coincide with the orthographic projections of the shielding electrodes 1013 on the base substrate 1011 (that is, exactly coinciding or within an error range caused by factors such as manufacturing and measuring), in other words, the orthographic projections of the resistance reduction electrodes 1015 on the base substrate 1011 do not overlap the orthographic projections of all the first hollowed-out structures $K_1$ on the base substrate 1011. In some embodiments, to facilitate manufacturing of the resistance reduction electrodes 1015, the resistance reduction electrodes 1015 may also be arranged in a whole surface mode in an area where the shielding electrodes 1013 are located in the bezel region BB.

In some embodiments, the resistance reduction electrodes 1015 may be arranged on the same layer as the first electrodes 121 of the photosensitive devices 1012 so as to finish manufacturing of the resistance reduction electrodes 1015 and the first electrodes 121 by adopting the same film and based on a one-time patterning process, the patterning frequency is reduced, and production efficiency is improved.

In some embodiments, as shown in FIG. 1, further includes a plurality of transistors TFT located between the photoelectric conversion layers 122 and the base substrate 1011, and the first electrodes 121 and first poles (such as source electrodes or drain electrodes) of the transistors TFT are reused, that is, the first poles and the first electrodes 121 may be formed integrally. In some embodiments, as shown in FIG. 22, a layer where the first electrodes 121 are located may further be located on a side of the first poles of the transistors TFT away from the base substrate 1011, and the first electrodes 121 and the first poles of the transistors TFT are electrically connected.

Figure 22:
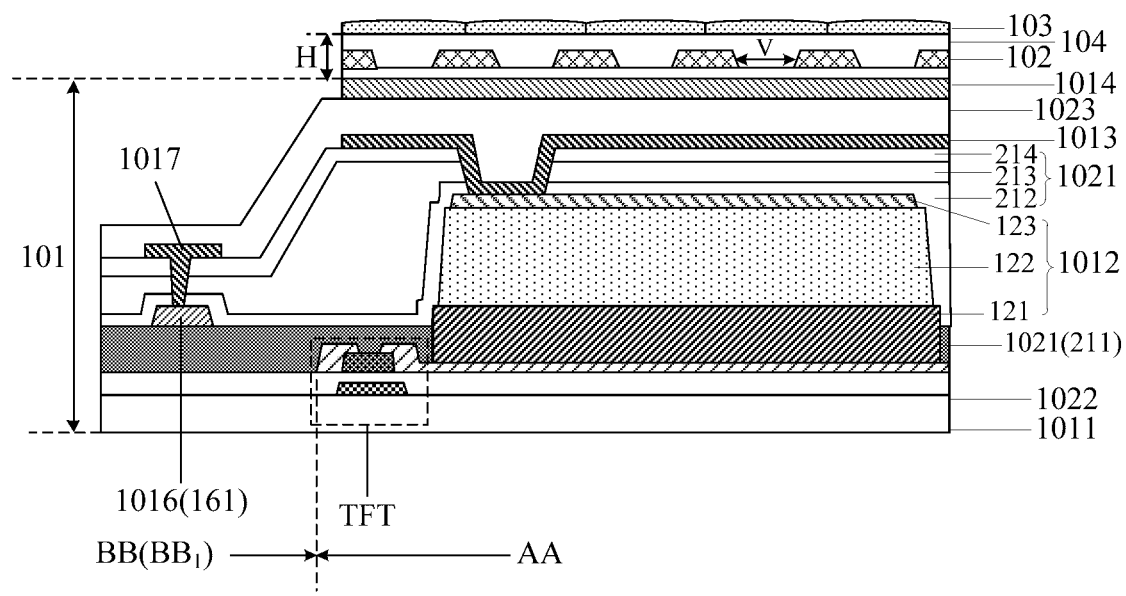
FIG. 22 is yet another schematic structural diagram of a ridge identification module provided by an embodiment of the present disclosure.

In some embodiments, as shown in FIG. 1 and FIG. 22, the ridge identification substrate 101 may further include a plurality of binding electrodes 1016, the plurality of binding electrodes 1016 are located on a side of the shielding electrodes 1013 away from the ridge identification region AA, the plurality of binding electrodes 1016 and the first electrodes 121 are arranged on the same layer, so as to finish manufacturing of the binding electrodes 1016 and the first electrodes 121 by adopting the same film and based on the one-time patterning process, the patterning frequency is saved, and the production efficiency is improved.

Figure 23:
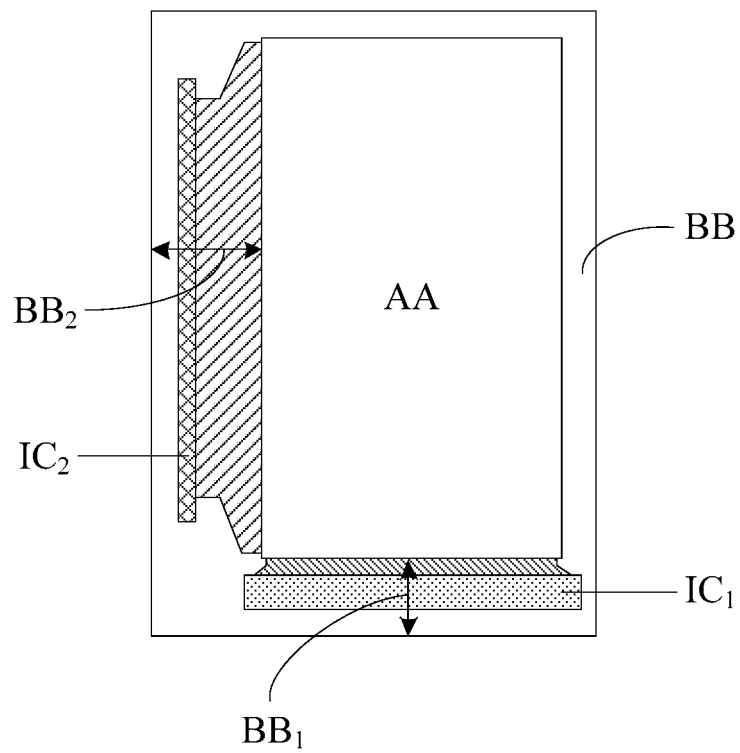
FIG. 23 is yet another schematic structural diagram of a ridge identification module provided by an embodiment of the present disclosure.

In some embodiments, as shown in FIG. 1, FIG. 22 and FIG. 23, the bezel region BB surrounds the ridge identification region AA, and the bezel region BB includes a first bezel region $BB_1$ configured to bind a bias voltage chip (not shown in the figures); each binding electrode 1016 includes a first binding electrode 161 located in the first bezel region $BB_1$; the ridge identification substrate 101 further includes first connection electrodes 1017 arranged on the same layer with the bias electrodes 1013 at the first binding electrodes 161, the first binding electrodes 161 are electrically connected with the bias electrodes 1013 through the first connection electrodes 1017, and therefore bias voltage signals provided by the bias chip sequentially pass through the first binding electrodes 161 and the first connection electrodes 1017 to be provided for the bias electrodes 1013. In some embodiments, the first connection electrodes 1017 and the bias electrodes 1013 may be integrally arranged.

Figure 24:
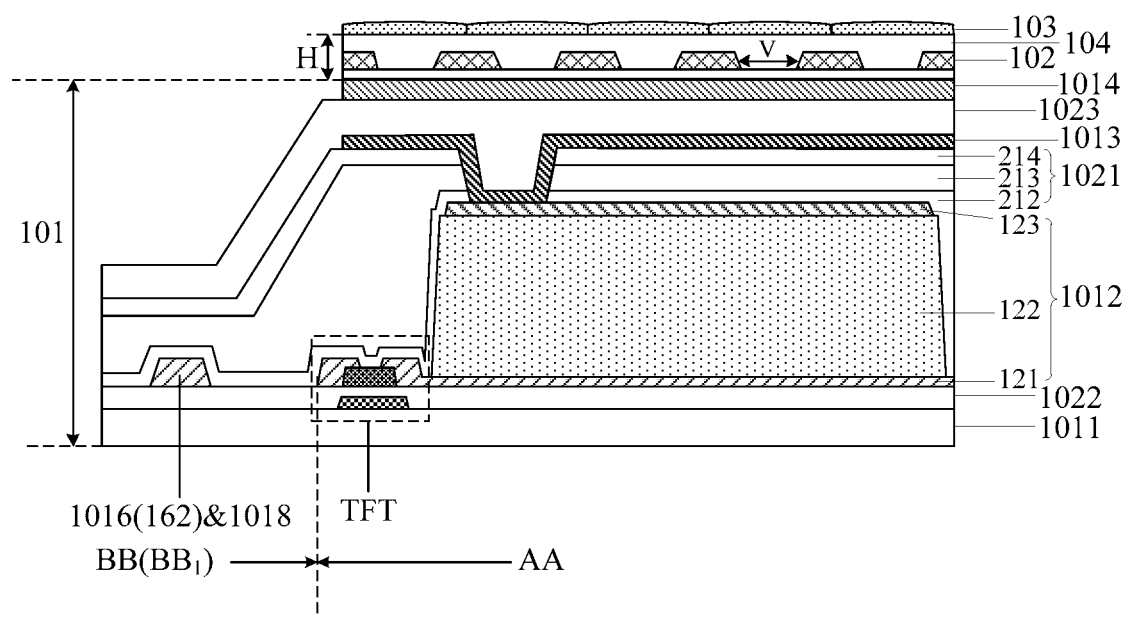
FIG. 24 is yet another schematic structural diagram of a ridge identification module provided by an embodiment of the present disclosure.
Figure 25:
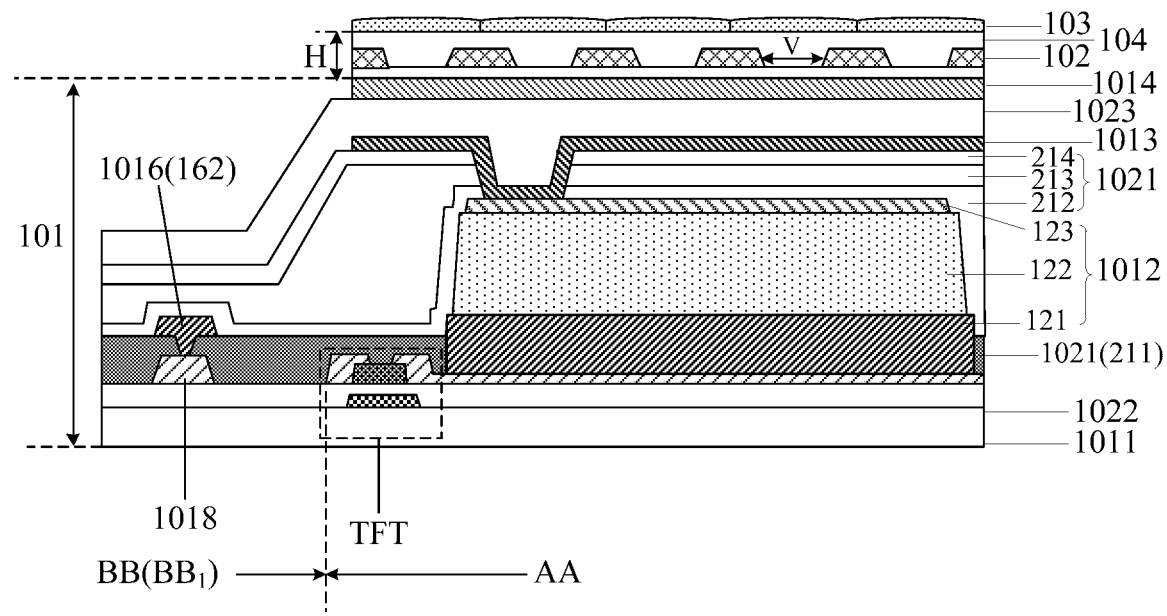
FIG. 25 is yet another schematic structural diagram of a ridge identification module provided by an embodiment of the present disclosure.

In some embodiments, as shown in FIG. 23 to FIG. 25, the first bezel region $BB_1$ is further configured to bind a data drive chip (Source IC) $IC_1$, and the binding electrodes 1016 may further include second binding electrodes 162 located in the first bezel region $BB_1$. The ridge identification substrate 101 may further include second connection electrodes 1018 located on the same layer as the first poles of the transistors TFT at the second binding electrodes 162, the second binding electrodes 162 are electrically connected with the first poles of the transistors TFT through the second connection electrodes 1018, and optionally, the second connection electrodes 1018 may be electrically connected with the first poles of the transistors TFT through the data lines DL.

Figure 26:
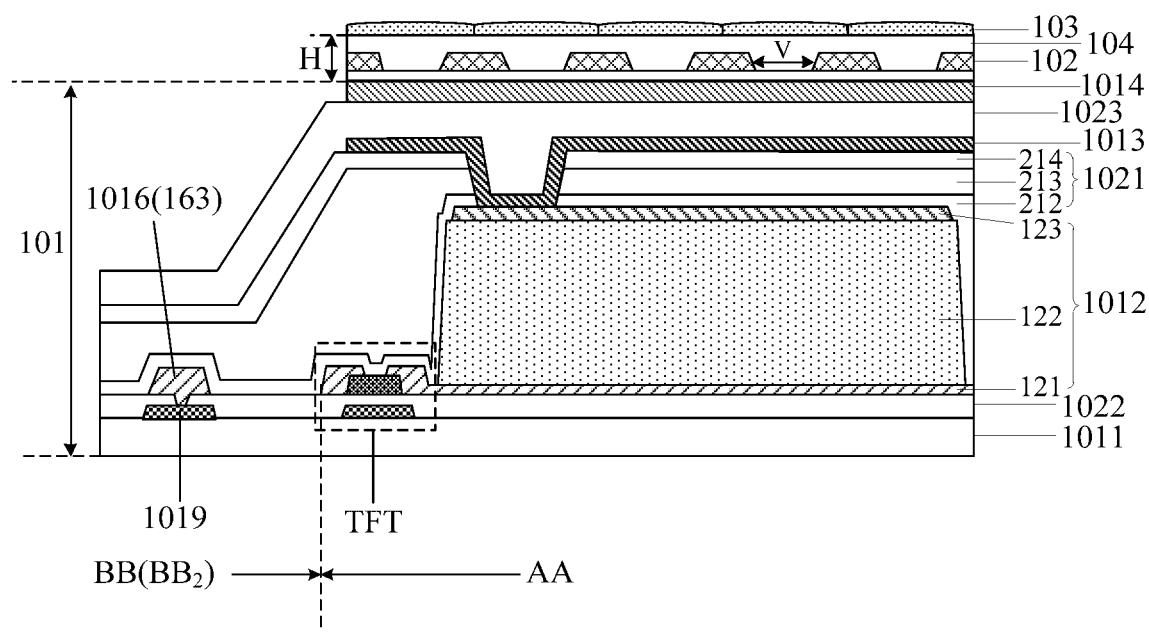
FIG. 26 is yet another schematic structural diagram of a ridge identification module provided by an embodiment of the present disclosure.
Figure 27:
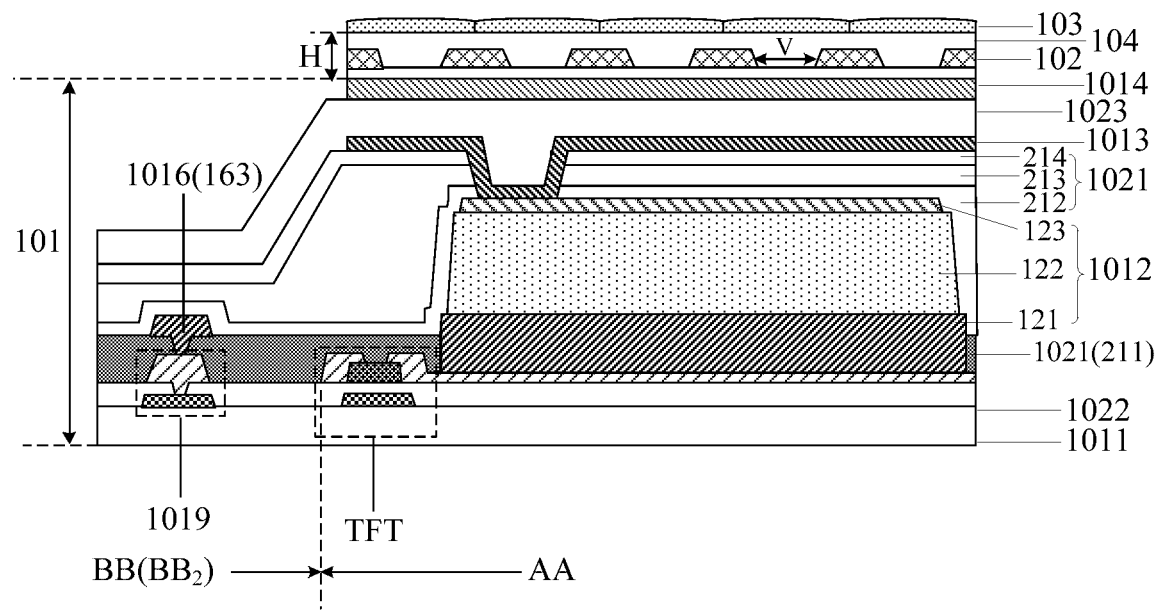
FIG. 27 is yet another schematic structural diagram of a ridge identification module provided by an embodiment of the present disclosure.

In some embodiments, as shown in FIG. 23, FIG. 26 and FIG. 27, the bezel region BB may further include a second bezel region $BB_2$ configured to bind a gate drive chip (Gate IC) $IC_2$, and the second binding region $BB_2$ is connected with the first bezel region $BB_1$; the binding electrodes 1016 further include third binding electrodes 163 located in the second binding region $BB_2$; and the ridge identification substrate 101 further includes corresponding electrically-connected third connection electrodes 1019 located in the layer where the first poles of the transistors TFT are located and a layer where gates of the transistors TFT are located at the third binding electrodes 163, the third binding electrodes 163 are electrically connected with the gates of the transistors TFT through the third connection electrodes 1019, and optionally, the third connection electrodes 1019 are electrically connected with the gates of the transistors TFT through the grid lines GL.

Figure 28:
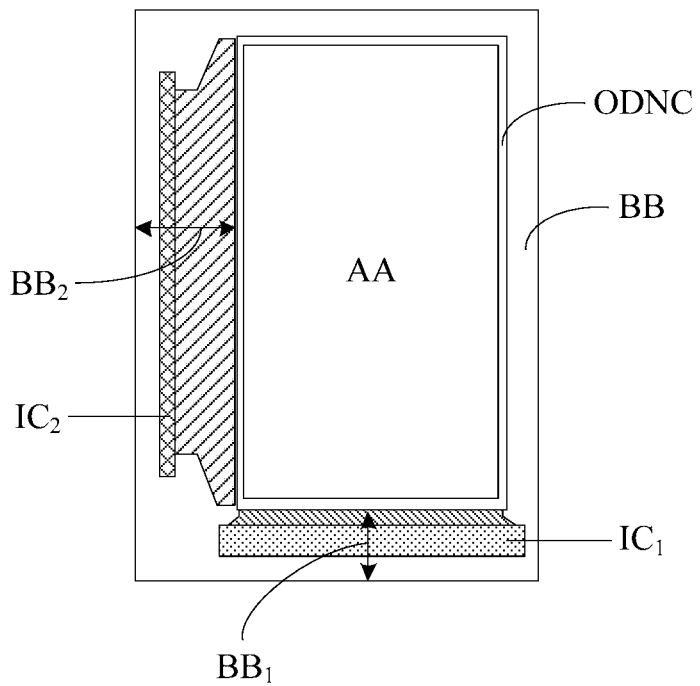
FIG. 28 is yet another schematic structural diagram of a ridge identification module provided by an embodiment of the present disclosure.
Figure 29:
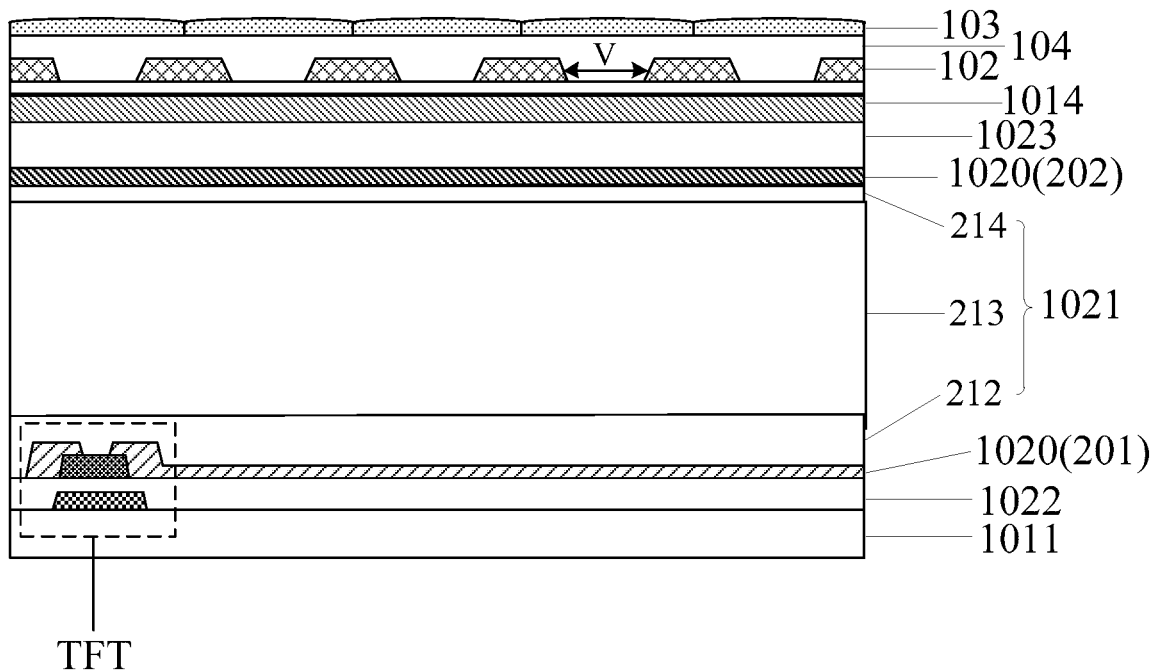
FIG. 29 is a schematic structural diagram of a pixel in a noise reduction region provided by an embodiment of the present disclosure.
Figure 30:
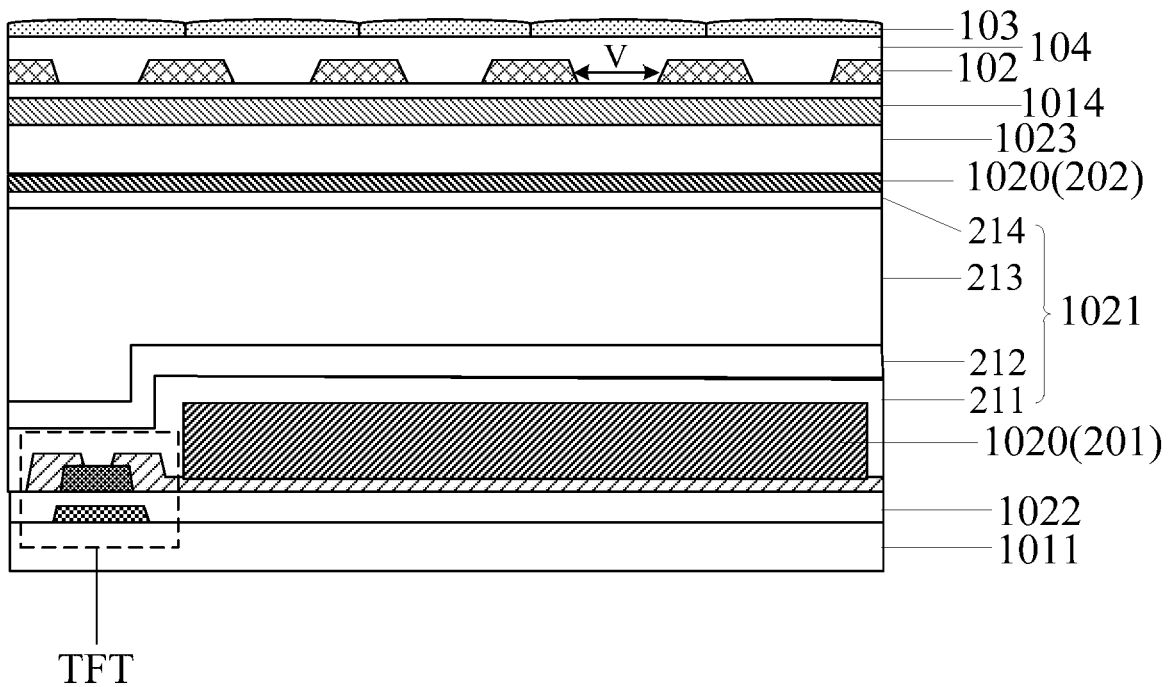
FIG. 30 is yet another structural diagram of a pixel in a noise reduction region provided by an embodiment of the present disclosure.

In some embodiments, the ridge identification module as shown in FIG. 28 to FIG. 30, may further include a noise reduction region ODNC located between the ridge identification region AA and the bezel region BB, the noise reduction region ODNC has a plurality of virtual devices 1020 arranged in an array mode, each virtual device 1020 includes a third electrode 201 and a fourth electrode 202 oppositely arranged, an insulation layer 1021 is arranged between each third electrode 201 and the corresponding fourth electrode 202, the third electrodes 201 may be arranged on the same layer as the first electrodes 121, the fourth electrodes 202 may be arranged on the same layer with the bias electrodes 1013, and each insulation layer 1021 may include a first inorganic insulation layer 211, a protection layer 212, an organic insulation layer 213 and a second inorganic insulation layer 214.

Optionally, as shown in FIG. 29 and FIG. 30, the ridge identification substrate 101 provided by embodiments of the present disclosure may further include a gate insulation layer 1022, a third inorganic insulation layer 1023, etc., and other essential components of the ridge identification substrate 101 should be all understood by those ordinarily skilled in the art, which is not repeated here, nor shall they be taken as a limitation to the present disclosure.

Based on the same inventive concept, an embodiment of the present disclosure provides a manufacturing method of the above ridge identification module, and since a principle of solving problems by the manufacturing method is similar to a principle of solving problems by the ridge identification module, implementation of the manufacturing method provided by the embodiment of the present disclosure may refer to implementation of the ridge identification module provided by the embodiment of the present disclosure, and the repetition will not omitted.

Figure 31:
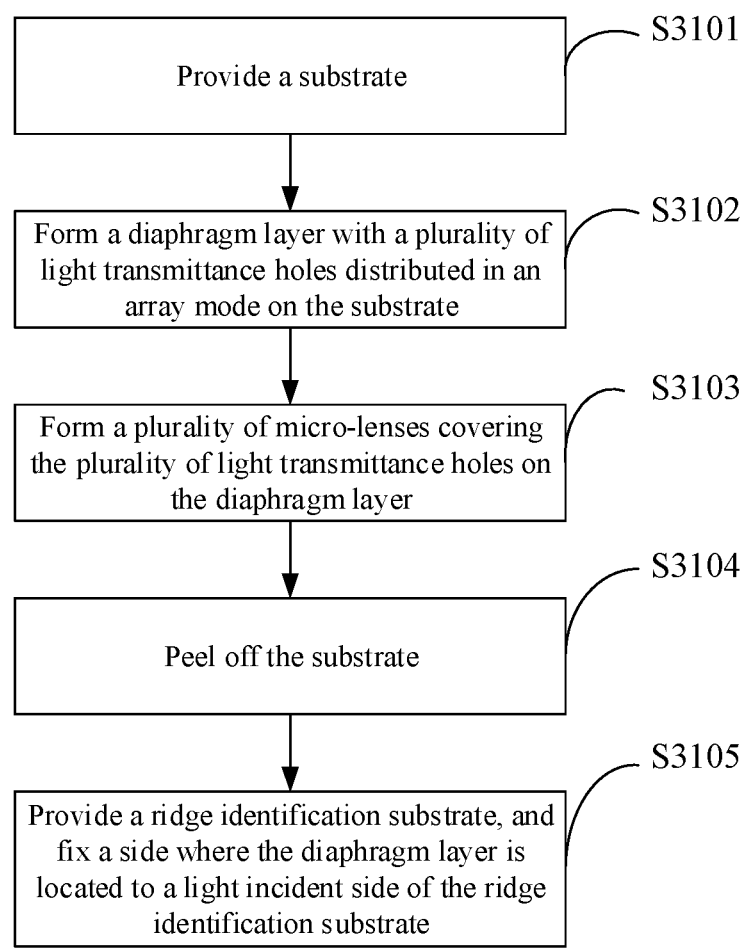
FIG. 31 is a flow diagram of a manufacturing method of a ridge identification module provided by an embodiment of the present disclosure.

In some embodiments, an embodiment of the present disclosure provides a manufacturing method of an above ridge identification module, as shown in FIG. 31, including following steps:

S3101, a substrate is provided;

S3102, a diaphragm layer having a plurality of light transmittance holes distributed in an array mode is formed on the substrate;

S3103, a plurality of micro-lenses covering the plurality of light transmittance holes are formed on the diaphragm layer;

S3104, the substrate is peeled off; and

S3105, a ridge identification substrate is provided, and a side where the diaphragm layer is located is fixed to a light incident side of the ridge identification substrate.

In some embodiments, the above manufacturing method provided by the embodiment of the present disclosure specifically may be achieved through following modes.

Figure 32:
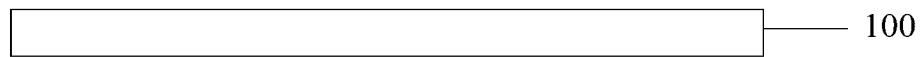
FIG. 32 is a schematic structural diagram of a ridge identification module in a manufacturing process provided by an embodiment of the present disclosure.

Firstly, the substrate 100 is provided, as shown in FIG. 32.

Figure 33:
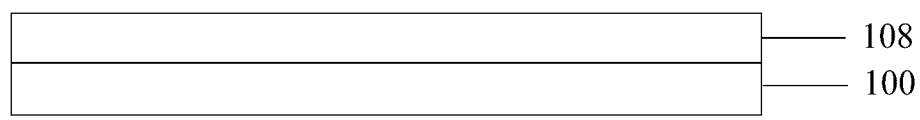
FIG. 33 is yet another schematic structural diagram of a ridge identification module in a manufacturing process provided by an embodiment of the present disclosure.

Secondly, a second transparent filling layer 108 with a thickness of 10 μm~40 μm and a refractive index of 1.4~1.8 is formed on the substrate 100, as shown in FIG. 33.

Figure 34:
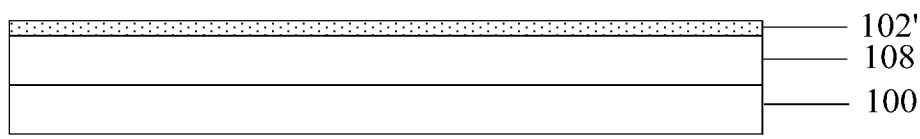
FIG. 34 is yet another schematic structural diagram of a ridge identification module in a manufacturing process provided by an embodiment of the present disclosure.

Thirdly, a light shielding material layer 102' for manufacturing the diaphragm layer 102 is formed on the second transparent filling layer 108, as shown in FIG. 34, and a thickness of the light shielding material layer 102' is 2 μm~8 μm.

Figure 35:
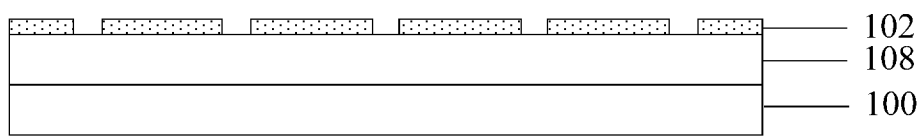
FIG. 35 is yet another schematic structural diagram of a ridge identification module in a manufacturing process provided by an embodiment of the present disclosure.

Fourthly, the light shielding material layer 102' is embossed to form the diaphragm layer 102 with the plurality of light transmittance holes formed in the array mode, as shown in FIG. 35; in the related art, the thickness of the diaphragm layer 102 is 0.5 μm~1 μm, and generally, a patterning process is usually adopted for etching to form the light transmittance holes in the diaphragm layer 102; and the thickness of the diaphragm layer 102 in the present disclosure is 2 μm~8 μm, it can be seen that the diaphragm layer 102 in the present disclosure is thicker, and therefore an embossing process with lower cost and simple procedures may be adopted for forming the light transmittance holes in the diaphragm layer 102. Certainly, in some embodiments, the patterning process may also be adopted in the present disclosure for etching to form the light transmittance holes in the diaphragm layer 102.

Figure 36:
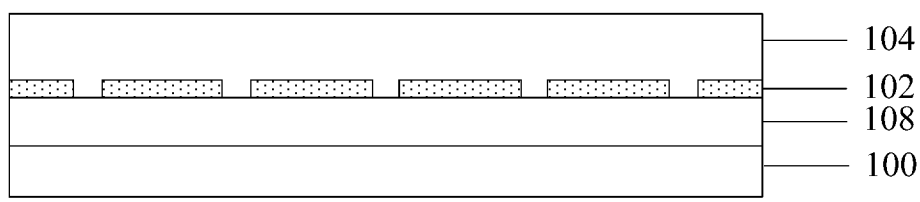
FIG. 36 is yet another schematic structural diagram of a ridge identification module in a manufacturing process provided by an embodiment of the present disclosure.

Fifthly, a first transparent filling layer 104 with a thickness of 10 μm~40 μm and a refractive index of 1.4~1.8 is formed on the diaphragm layer 102, as shown in FIG. 36.

Figure 37:
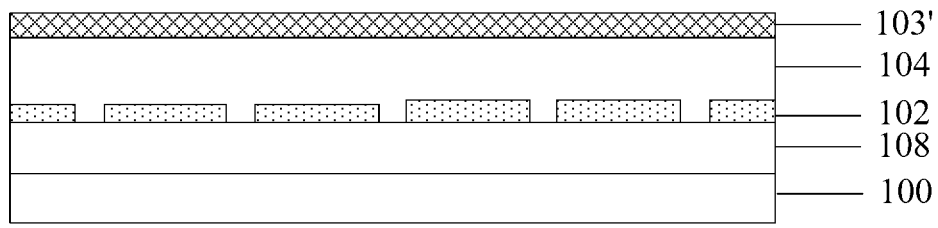
FIG. 37 is yet another schematic structural diagram of a ridge identification module in a manufacturing process provided by an embodiment of the present disclosure.

Sixthly, a transparent material layer 103' used for manufacturing the micro-lenses 103 is formed on the first transparent filling layer 104, as shown in FIG. 37; and a thickness of the transparent material layer 103' is 2 μm~16 μm, and a refractive index of the transparent material layer 103' is 1.5~2.2.

Figure 38:
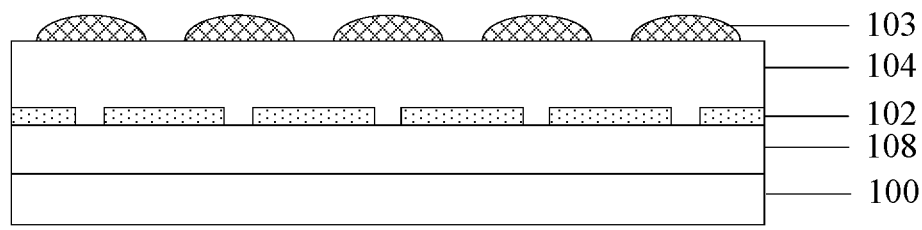
FIG. 38 is yet another schematic structural diagram of a ridge identification module in a manufacturing process provided by an embodiment of the present disclosure.

Seventhly, the transparent material layer 103' is embossed or patterned to form a plurality of micro-lenses 103 covering the plurality of light transmittance holes, as shown in FIG. 38; and apertures of the micro-lenses 103 are 1 μm~30 μm.

Figure 39:
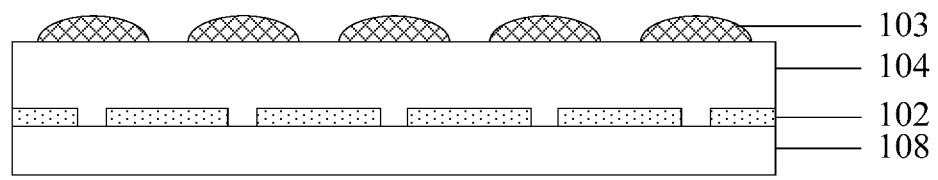
FIG. 39 is yet another schematic structural diagram of a ridge identification module in a manufacturing process provided by an embodiment of the present disclosure.

Eighthly, the substrate 100 is peeled off, and the second transparent filling layer 108, the diaphragm layer 102, the first transparent filling layer 104 and the plurality of micro-lenses 103 which are arranged in a stacked mode are obtained, as shown in FIG. 39.

Figure 40:
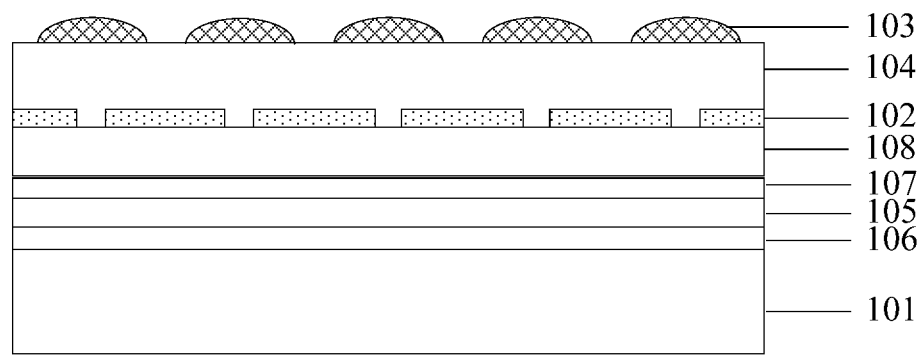
FIG. 40 is a schematic structural diagram of a ridge identification module provided by an embodiment of the present disclosure.

Ninthly, a ridge identification substrate 101 and an infrared cut coating 105 are provided, a first adhesive layer 106 is adopted for fixing the infrared cut coating 105 to a light incident side of the ridge identification substrate 101, and then, a second adhesive layer 107 is adopted to enable the second transparent filling layer 108 and a side of the infrared cut coating 105 away from the ridge identification substrate 101 to be fixed and bonded, as shown in FIG. 40. Thicknesses of the first adhesive layer 106 and the second adhesive layer 107 are both less than or equal to 15 μm, and a thickness of the infrared cut coating 105 is 10 μm~40 μm, so that manufacturing of the ridge identification module provided by the embodiment of the present disclosure is finished.

Figure 41:
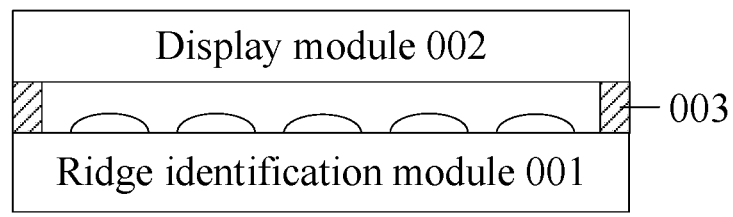
FIG. 41 is a schematic structural diagram of a display apparatus provided by an embodiment of the present disclosure.

Based on the same inventive conception, an embodiment of the present disclosure provides a display apparatus, as shown in FIG. 41, including a ridge identification module 001, a display module 002 and an adhesive layer 003, wherein the ridge identification module 001 is the above ridge identification module 001 provided by the embodiment of the present disclosure, the ridge identification module 001 is located on an opposite side of a display side of the display module 002, the adhesive layer 003 is located between the display module 002 and the ridge identification module 001, an orthographic projection of the adhesive layer 003 on the display module 002 surrounds a display region of the display module 002, and therefore space enclosed by the ridge identification module 001, the display module 002 and the adhesive layer 003 forms an air gap, which is beneficial to maintaining an unchangeable optical path propagation direction of finger reflection light.

During fingerprint identification, when fingers touch the display module 002, the micro-lenses 103 are combined with the diaphragm layer 102 to be able to screen out rays with a small angle in the finger reflection rays in an appropriate-collimation mode, and therefore the rays may arrive at the photoelectric conversion layers 122 of the photosensitive devices 1012 below. The photoelectric conversion layers 122 may detect the strength of the rays, and due to the difference in the energy of light diffused downward from the valley and ridge, light intensities obtained by detection of the array of the photosensitive devices 1012 are different, and therefore fingerprint image information is obtained.

In some embodiments, the display apparatus provided by the embodiment of the present disclosure may be a mobile phone, a tablet personal computer, a television, a display, a notebook computer, a digital photo frame, a navigator, a smart watch, a fitness wristband, a personal digital assistant and other any products or components with display functions. The display apparatus includes, but not limited to, a radio frequency unit, a network module, an audio output & input unit, a sensor, a display unit, a user input unit, an interface unit, a memory, a processor, a power supply and other components. In addition, those skilled in the art may understand that the above structure does not constitute a limitation to the above display apparatus provided by the embodiment of the present disclosure, in other words, the display apparatus provided by the embodiment of the present disclosure may include above more or less components, or a combination of some components or be provided with different components.

Apparently, those skilled in the art may perform various alterations and variations to the embodiments of the present disclosure without departing from the spirit and scope of the embodiments of the present disclosure. Therefore, if the modifications and variations of the embodiments of the present disclosure fall within the scope of the claims of the present disclosure and their equivalents, the present disclosure is also intended to include such modifications and variations.

What is claimed is:

1. A ridge identification module, comprising:
   a ridge identification substrate comprising:
   a base substrate comprising a ridge identification region and a bezel region on at least one side of the ridge identification region;
   a plurality of photosensitive devices arranged on a side of the base substrate in an array mode; and
   shielding electrodes on a side, away from the base substrate, of a layer where the plurality of photosensitive devices are, wherein the shielding electrodes are located in the ridge identification region and the bezel region, and the shielding electrodes located in the bezel region comprise a plurality of hollowed-out structures;
   a diaphragm layer on a side of the plurality of photosensitive devices on the ridge identification substrate, wherein a quantity of the diaphragm layer is one, the diaphragm layer comprises light transmittance holes distributed in the array mode, orthographic projections of the light transmittance holes on the base substrate are in orthographic projections of the photosensitive devices on the base substrate, and a ratio of a depths of the light transmittance hole to a maximum apertures of the light transmittance holes is greater than or equal to ⅙ and less than or equal to 2; and
   a plurality of micro-lenses on a side away from the ridge identification substrate, of the diaphragm layer, wherein orthographic projections of the micro-lenses on the base substrate cover the orthographic projections of the light transmittance holes on the base substrate.

2. The ridge identification module according to claim 1, wherein:
   apertures of the light transmittance holes are approximately the same in a direction of the ridge identification substrate pointing to the diaphragm layer, or
   apertures of the light transmittance holes are gradually increased in a direction of the ridge identification substrate pointing to the diaphragm layer.

3. The ridge identification module according to claim 1, wherein the maximum aperture $d_1$ of the light transmittance holes and a minimum aperture $d_2$ of the light transmittance holes meet a following relation:

$$d_1 = D * h/H + d_2;$$

D is an aperture of the micro-lens, h is the depth of the light transmittance holes, and H is a distance between a surface of a side of the ridge identification substrate facing the diaphragm layer and a surface of a side of the micro-lenses facing the diaphragm layer;
wherein 1 µm≤D≤50 µm, 2 µm≤h≤8 µm, 4 µm≤$d_1$≤12 µm, 1 µm≤$d_2$≤6 µm, and 40 µm≤H≤160 µm.

4. The ridge identification module according to claim 1, further comprising a transparent filling layer between the diaphragm layer and a layer where the plurality of micro-lenses are; and
a distance H between a surface of a side of the ridge identification substrate facing the diaphragm layer and a surface of a side of the micro-lenses facing the diaphragm layer meeting a following relation:

$$H = [D^2/(8h_x) + h_x/2]/(n_x - 1) - n * h_x/n_x;$$

D is an aperture of the micro-lens, h is the depth of the light transmittance hole, $h_x$ is a vector height of the micro-lenses, n is a refractive index of a material used by the micro-lens, and $n_x$ is a refractive index of the transparent filling layer;
wherein 2 µm≤$h_x$≤16 µm, 1.4 µm≤$n_x$≤1.8 µm, and 1.5 µm≤n≤2.2 µm.

5. The ridge identification module according to claim 1, wherein the micro-lenses are in one-to-one correspondence with the light transmittance holes, centers of the orthographic projections of the micro-lenses on the base substrate approximately coincide with centers of the orthographic projections of the light transmittance holes on the base substrate.

6. The ridge identification module according to claim 5, wherein the micro-lens comprises a convex surface and a flat surface, and the convex surface is on a side of the flat surface away from the light transmittance holes.

7. The ridge identification module according to claim 1, further comprising an infrared cut coating between the diaphragm layer and the ridge identification substrate.

8. The ridge identification module according to claim 1, wherein an area of an orthographic projection of the hollowed-out structure on an outmost side on the base substrate is greater than an areas of an orthographic projection of a remaining hollowed-out structures on the base substrate in an extension direction of the bezel region.

9. The ridge identification module according to claim 1, wherein the plurality of photosensitive devices are arranged in the ridge identification region in the array mode, and the plurality of hollowed-out structures and the photosensitive devices are arranged in the same rows or columns.

10. The ridge identification module according to claim 9, wherein the hollowed-out structures in the same rows or columns with the photosensitive devices are arranged in a mutually independent or communicating mode.

11. The ridge identification module according to claim 1, further comprising a plurality of gate lines and a plurality of data lines arranged in a crossed mode, and the plurality of gate lines and the plurality of data lines extend to a side away from the ridge identification region, of the shielding electrodes from the ridge identification region.

12. The ridge identification module according to claim 1, wherein the ridge identification substrate further comprises bias electrodes between the layer where the plurality of photosensitive devices are and a layer where the shielding electrodes are, and the bias electrodes are electrically connected with the shielding electrodes.

13. The ridge identification module according to claim 12, wherein orthographic projections of the bias electrodes on the base substrate approximately coincide with orthographic projections of the shielding electrodes on the base substrate.

14. The ridge identification module according to claim 12, wherein the ridge identification substrate further comprises resistance reduction electrodes between a layer where the bias electrodes are and the base substrate, and the resistance reduction electrodes are electrically connected with the shielding electrodes through the bias electrodes.

15. The ridge identification module according to claim 14, wherein the resistance reduction electrodes are in the bezel region, and orthographic projections of the resistance reduction electrodes on the base substrate approximately coincide with orthographic projections of the shielding electrodes on the base substrate in the bezel region,
or
the resistance reduction electrodes are located in the bezel region, and in the bezel region, the resistance reduction electrodes are arranged in a whole surface mode in an area where the shielding electrodes are.

16. The ridge identification module according to claim 14, wherein the photosensitive devices comprises a first electrode, a photoelectric conversion layer and a second electrode which are arranged in a stacked mode, the first electrode is arranged close to the base substrate, and the resistance reduction electrode and the first electrode are arranged on the same layer.

17. The ridge identification module according to claim 16, further comprising a plurality of transistors between the photoelectric conversion layers and the base substrate, and the first electrodes is reused as first poles of the transistors,
or
further comprising a plurality of transistors between the photoelectric conversion layers and the base substrate, a layer where the first electrodes are is on a side away from the base substrate, of the first poles of the transistors, and the first electrodes are electrically connected with the first poles of the transistors.

18. The ridge identification module according to claim 16, wherein the ridge identification substrate further comprises a plurality of binding electrodes, the plurality of binding electrodes are on a side of away from the ridge identification region, of the shielding electrodes, and the plurality of binding electrodes and the first electrodes are arranged on the same layer.

19. The ridge identification module according to claim 18, wherein the bezel region surrounds the ridge identification region, and the bezel region comprises a first bezel region configured to bind a bias voltage chip;
the binding electrodes comprises a first binding electrode in the first bezel region; and
the ridge identification substrate further comprises first connection electrodes arranged on a layer same as a layer where the bias electrodes are, at the first binding electrodes, and the first binding electrodes are electrically connected with the bias electrodes through the first connection electrodes.

20. The ridge identification module according to claim 19, wherein the first bezel region is further configured to bind a data drive chip;
the binding electrodes further comprises a second binding electrode in the first bezel region; and
the ridge identification substrate further comprises second connection electrodes arranged on a layer same as a layer where the first poles of the transistors are, at the second binding electrodes, and the second binding electrodes are electrically connected with second poles of the transistors through the second connection electrodes.

21. The ridge identification module according to claim 19, wherein the bezel region further comprises a second bezel region configured to bind a gate drive chip, and the second bezel region is connected with the first bezel region;

the binding electrodes further comprises a third binding electrode in the second bezel region; and the ridge identification substrate further comprises third connection electrodes electrically-connected to the first poles of the transistors, and a layer where gates of the transistors are, at the third binding electrodes, and the third binding electrodes are electrically connected with the gates of the transistors through the third connection electrodes.

\* \* \* \* \*